(12) United States Patent
Nieuwoudt et al.

(10) Patent No.: US 11,583,827 B2
(45) Date of Patent: Feb. 21, 2023

(54) COUNTERCURRENT CONTACTING DEVICES AND METHOD OF MANUFACTURE

(71) Applicant: Koch-Glitsch, LP, Wichita, KS (US)

(72) Inventors: Izak Nieuwoudt, Wichita, KS (US); Sergio Escobar, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 1008 days.

(21) Appl. No.: 16/281,351

(22) Filed: Feb. 21, 2019

(65) Prior Publication Data

US 2019/0184367 A1 Jun. 20, 2019

Related U.S. Application Data

(63) Continuation-in-part of application No. 16/122,470, filed on Sep. 5, 2018, now Pat. No. 11,446,615.
(Continued)

(51) Int. Cl.
*B01J 19/32* (2006.01)
*B01J 8/34* (2006.01)
(Continued)

(52) U.S. Cl.
CPC ......... *B01J 19/32* (2013.01); *B01F 25/43151* (2022.01); *B01J 8/34* (2013.01);
(Continued)

(58) Field of Classification Search
CPC .............. B01F 25/4233; B01F 25/4315; B01F 25/43151; B01F 25/4314; B01F 25/43141; B01J 19/32
(Continued)

(56) References Cited

U.S. PATENT DOCUMENTS

| 4,643,584 A | 2/1987 | Allocca |
| 5,378,063 A | 1/1995 | Tsukada |
(Continued)

FOREIGN PATENT DOCUMENTS

| CN | 202191855 U | 4/2012 |
| CN | 202237835 U | 5/2012 |
(Continued)

OTHER PUBLICATIONS

International Search Report & Written Opinion, for corresponding PCT Application No. PCT/IB2018/056785,11 pages.
(Continued)

*Primary Examiner* — Marc C Howell

(57) ABSTRACT

The contacting device for countercurrent contacting of fluid streams and having a first pair of intersecting grids of spaced-apart and parallel deflector blades and a second pair of intersecting grids of spaced-apart and parallel deflector blades. The deflector blades in each one of the grids are interleaved with the deflector blades in the paired intersecting grid and may have uncut side portions that join them together along a transverse strip where the deflector blades cross each other and cut side portions that extend from the uncut side portions to the ends of the deflector blades. At least some of the deflector blades have directional tabs and associated openings to allow portions of the fluid streams to pass through the deflector blades to facilitate mixing of the fluid streams.

2 Claims, 23 Drawing Sheets

Related U.S. Application Data

(60) Provisional application No. 62/555,875, filed on Sep. 8, 2017.

(51) Int. Cl.
 *B01F 25/431* (2022.01)
 *C10G 11/18* (2006.01)

(52) U.S. Cl.
 CPC .............. *B01J 2219/3221* (2013.01); *B01J 2219/32227* (2013.01); *B01J 2219/32244* (2013.01); *B01J 2219/32248* (2013.01); *B01J 2219/32286* (2013.01); *B01J 2219/32408* (2013.01); *C10G 11/18* (2013.01)

(58) Field of Classification Search
 USPC ................................................. 366/337, 340
 See application file for complete search history.

(56) References Cited

U.S. PATENT DOCUMENTS

| | | | |
|---|---|---|---|
| 5,435,061 A | 7/1995 | Lantz | |
| 5,492,408 A | 2/1996 | Alfare | |
| 6,224,833 B1 | 5/2001 | Rall | |
| 6,769,801 B1 | 8/2004 | Maurer et al. | |
| 8,491,180 B2 | 7/2013 | Hirschberg et al. | |
| 8,539,761 B2 * | 9/2013 | Lebas | B01F 25/3131 |
| | | | 366/338 |
| 2002/0060951 A1 * | 5/2002 | Gruetter | B01J 19/32 |
| | | | 366/337 |
| 2011/0305103 A1 | 12/2011 | Mcguire et al. | |
| 2011/0305104 A1 | 12/2011 | Mcguire et al. | |
| 2013/0172170 A1 | 7/2013 | Kowalczyk et al. | |
| 2015/0071028 A1 | 3/2015 | Glanville | |

FOREIGN PATENT DOCUMENTS

| | | |
|---|---|---|
| CN | 205252929 U | 5/2016 |
| DE | 2810648 A1 | 9/1979 |
| EP | 0072875 A1 | 3/1983 |
| EP | 1206962 A1 | 5/2002 |
| JP | S5827634 A | 2/1983 |
| JP | H0639123 U | 5/1994 |
| JP | 3003581 U | 10/1994 |
| KR | 20050032554 A | 4/2005 |
| RU | 2076002 C1 | 3/1997 |
| RU | 2085246 C1 | 7/1997 |
| RU | 2099133 C1 | 12/1997 |

OTHER PUBLICATIONS

International Search Report and Written Opinion for International Application No. PCT/IB2020/051146, dated Jul. 9, 2020, 17 pages.
Office Action received for JP Application No. 2020-514278, dated Jun. 7, 2022, 19 Pages (09 Pages of English Translation and 10 Pages of Official notification).

* cited by examiner

COUNTERCURRENT CONTACTING DEVICES AND METHOD OF MANUFACTURE

TECHNICAL FIELD

The present invention relates generally to the countercurrent contacting of fluids and, more particularly to devices for the countercurrent contacting of a solid phase and a liquid phase or a liquid and a vapor phase and a method of manufacturing the countercurrent contacting device.

BACKGROUND ART

Contacting devices in the form of structured packings are used in various applications to cause blending or fluidization of multi-component mixtures flowing in countercurrent relationship within mass transfer columns, as well as to facilitate the chemical reaction, heat transfer and/or mass transfer of the fluid streams. Multiple contacting devices are typically stacked in end-to-end relationship within a region of a column through which a solid phase and a liquid phase or a liquid phase and a vapor phase are flowing in countercurrent relationship. These contacting devices are often employed in connection with fluidized beds used in petroleum, chemical, combustion, and other types of processes to promote vigorous mixing and intimate contact of fluid streams and solid particles within a vessel. This intimate contacting can be used to achieve efficient heat transfer, mass transfer and/or chemical reaction between the fluid streams, solid particles, and/or fluids coated on or entrained with the solid particles. An example of a fluidized bed involving countercurrent flow of fluid streams and solid particles is found in certain types of strippers and regenerators used in fluid catalytic cracking or FCC systems.

One of these types of contact devices is disclosed in U.S. Pat. No. 6,224,833 assigned to Koch-Glitsch, Inc. and is marketed as KFBE fluidized bed structured packing. The contact device uses two or more grids of blade-like crossing elements that are arranged to intersect with each other at a preselected angle and to also be positioned at an angle to the longitudinal axis of the column or vessel. The crossing elements in each grid are spaced apart a distance corresponding to the width of the crossing elements of the intersecting grid so that the crossing elements of the intersecting grids are interleaved with and are in sideways contact with each other at crossing points. These contacting crossing elements are typically individual elements that must be held in place and then welded together at the crossing points to secure them together.

The construction of the intersecting grids of the contacting devices by welding together the individual contacting crossing elements is a time-consuming and labor-intensive process. U.S. Pat. No. 5,435,061 discloses one approach to simplifying the construction process of contacting devices used as static mixers by using a metal casting process to form portions or subassemblies of the static mixers. The subassemblies are then joined together to form the static mixing device. While the number of welds required to construct the static mixer is reduced in this process, a need remains for a process of constructing contacting devices that increases the strength of the contacting devices by reducing the number of welds, but which also does not require the casting of subassemblies.

SUMMARY OF INVENTION

In one aspect, the present invention is directed to a contacting device for the countercurrent contacting of a solid and liquid phase or a liquid and vapor phase, the contact device comprising: a first grid formed of a first set of spaced-apart and parallel-extending deflector blades; a second grid formed of a second set of spaced-apart and parallel-extending deflector blades that are interleaved with and cross the first set of deflector blades at a preselected angle, adjacent ones of the interleaved deflector blades in the first and second sets each having opposite ends and side edges, the side edges having portions that join the adjacent ones of the interleaved deflector blades along a transverse strip where the deflector blades cross, and apertures formed in the deflector blades of the first and/or second sets of deflector blades and directional tabs associated with the apertures.

In another aspect, the invention is directed to a contacting device for the countercurrent contacting of a solid and liquid phase or a liquid and vapor phase, the contacting device comprising: a first grid formed of a first set of spaced-apart, parallel-extending, planar deflector blades; a second grid formed of a second set of spaced-apart, parallel-extending, planar deflector blades that are interleaved with and cross the first set of deflector blades at an included angle within the range of 45 to 135 degrees, adjacent ones of the interleaved deflector blades in the first and second sets of deflector blades each having opposite ends and linear side edges, the side edges having uncut portions that join the adjacent ones of the interleaved deflector blades in the first and second set of deflector blades along a first transverse strip where the deflector blades cross and cut portions that extend from the uncut portions to the opposite ends of the deflector blades, the deflector blades in the second grid each having a bent portion that places segments of the deflector blade on opposite sides of the bent portion in offset planes; a third grid formed of a third set of spaced-apart, parallel-extending, planar deflector blades; and a fourth grid formed of a fourth set of spaced apart, parallel-extending, planar deflector blades that are interleaved with and cross the third set of deflector blades at an included angle within the range of 45 to 135 degrees, adjacent ones of the interleaved deflector blades in the third and fourth sets of deflector blades each having opposite ends and linear side edges, the side edges having uncut portions that join the adjacent ones of the interleaved deflector blades in the third and fourth sets of deflector blades along a second transverse strip where the deflector blades cross and cut portions that extend from the uncut portions to the opposite ends of the deflector blades, the deflector blades in the fourth grid each having a bent portion that places segments of the deflector blade on opposite sides of the bent portion in offset planes that are parallel to each other, and apertures formed in the deflector blades of the first and/or second sets of deflector blades and directional tabs associated with the apertures. One of the ends in at least some of the deflector blades in the first set is uncut and is interconnected with an uncut one of the ends of the deflector blades in the third set along a reverse bend that aligns the first and second grids of deflector blades with the third and fourth grids of deflector blades. One of the ends in each of the deflector blades in the second set is spaced apart from and aligned with one of the ends in each of the deflector blades in the fourth set. The first, second, third and fourth grids have a least one side shaped to conform to a curved longitudinal plane.

In a further aspect, the invention is directed to a contacting device assembly comprising at least two of the contacting devices in which the interconnected uncut ends of the deflector blades in the first and third sets in one of the contacting devices are joined to said spaced apart and aligned ends of the deflector blades in the second and fourth sets in an adjacent one of the contacting devices.

In a still further aspect, the invention is directed to a method of making a contacting device assembly, comprising the steps of: cutting and bending one or more sheets of material to form a plurality of the contacting devices; and joining adjacent ones of the contacting devices together by joining the uncut ends of the deflector blades in the first and third sets in one of the adjacent contacting devices to the spaced apart and aligned ends of the deflector blades in the second and fourth sets in the other one of the adjacent contacting devices to form the contacting device assembly.

BRIEF DESCRIPTION OF DRAWINGS

In the accompany drawings that form part of the specification and in which like reference numerals are used to indicate like components in the various views.

DESCRIPTION OF EMBODIMENTS

Figure 1:
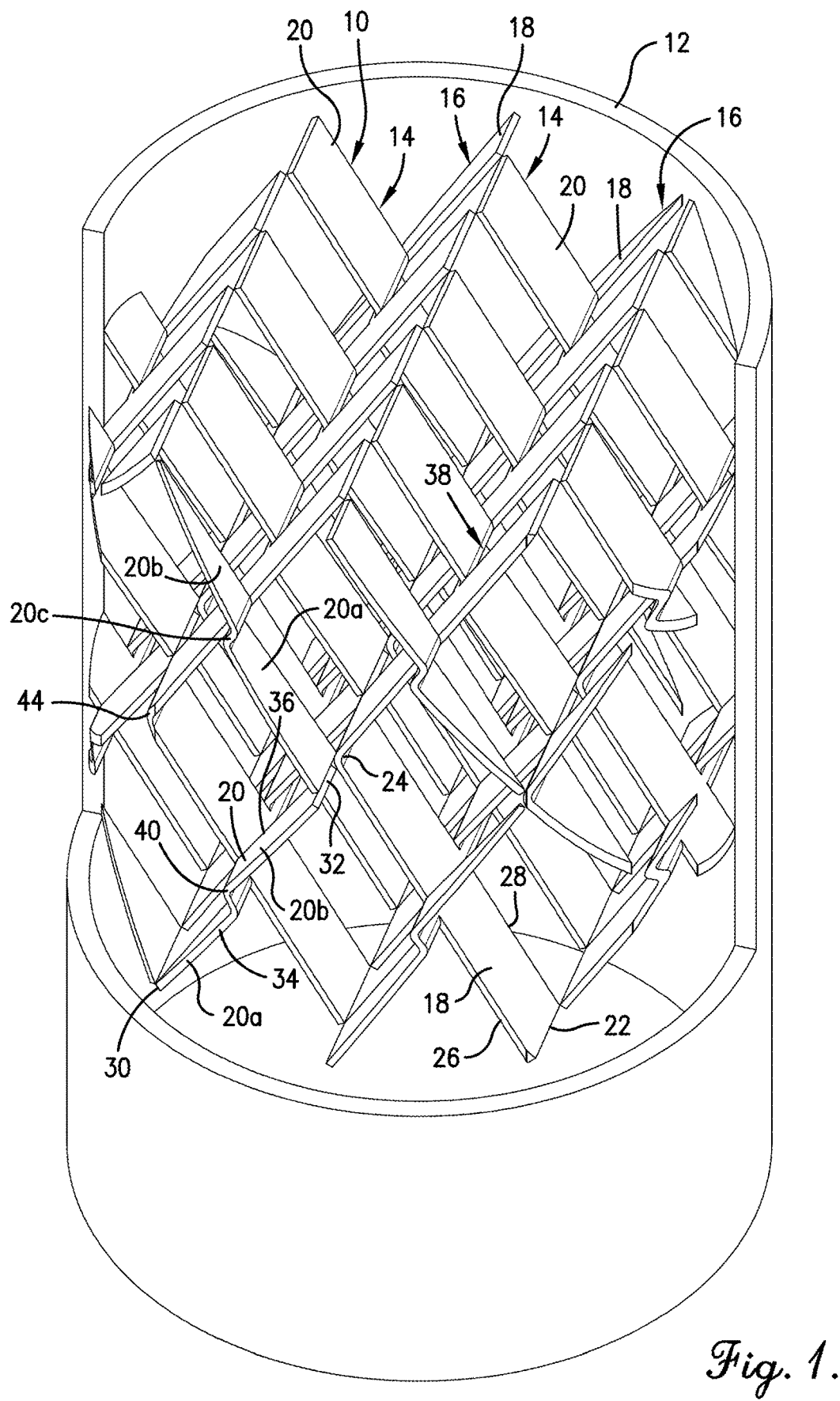
FIG. 1 is a side perspective view of a contacting device having intersecting grids of deflector blades and constructed according to an embodiment of the present invention and shown in a fragmentary portion of a column.
Figure 2:
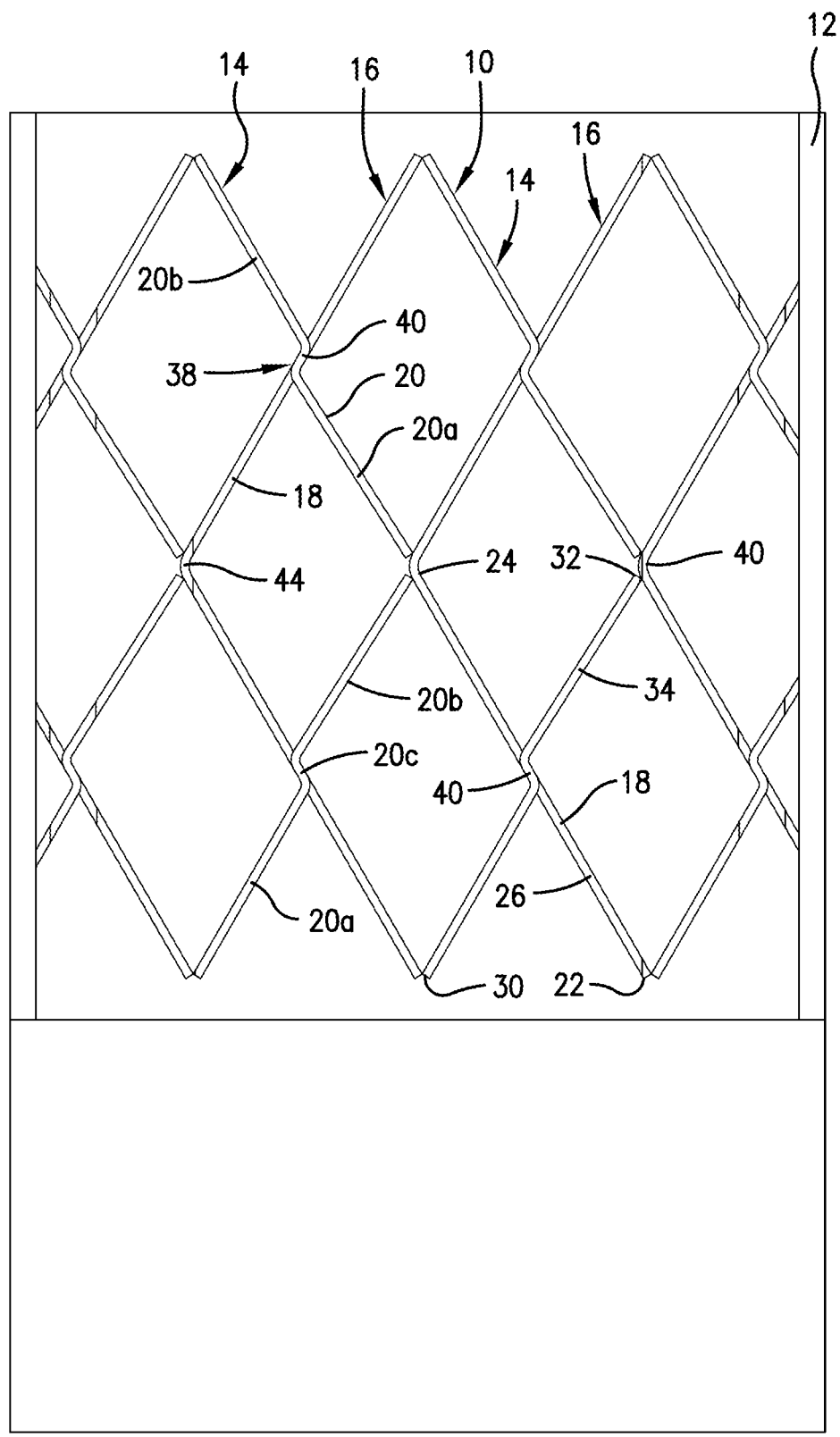
FIG. 2 is a side elevation view of the contacting device and column shown in FIG. 1.
Figure 3:
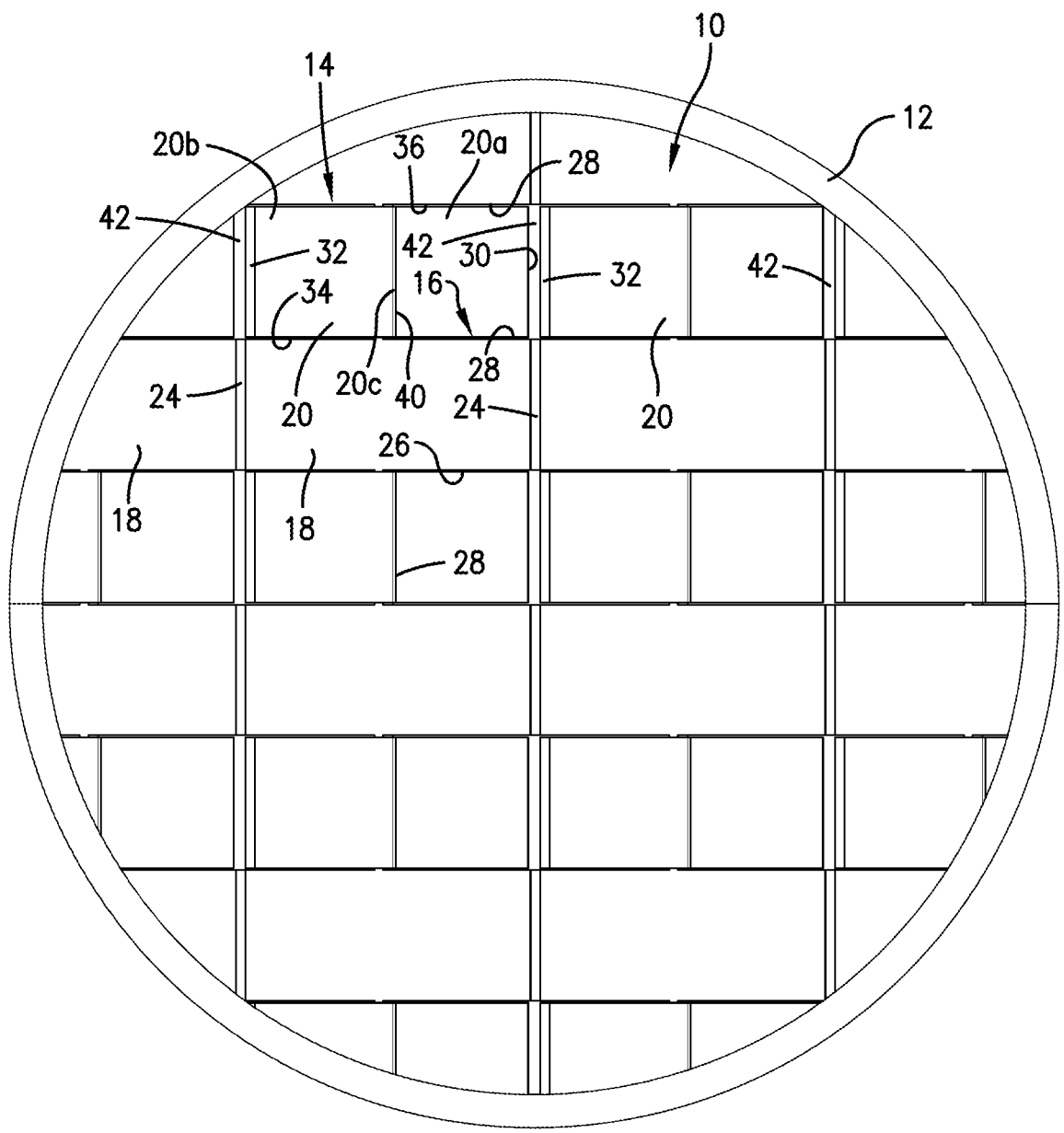
FIG. 3 is a top plan view of the contacting device and conduit shown in FIGS. 1 and 2.

Turning now to the drawings in greater detail and initially to FIGS. 1-3, one embodiment of a contacting device is designated generally by the numeral 10 and is shown within a cylindrical column 12 through which different phase streams are intended to flow in countercurrent relationship for intimate contact to achieve efficient heat transfer, mass transfer and/or chemical reaction between the phase components. The different phase streams include a solid phase and a liquid phase or a liquid phase and a vapor phase. The contacting device 10 fills a cross section of the conduit 10. Although only a single contacting device 10 is illustrated, multiple contacting devices 10 may be stacked in end-to-end relationship within the column 12, with adjacent ones of the contacting devices 10 aligned with or rotated with respect to each about a longitudinal center axis of the conduit 12.

Each of the contacting devices 10 comprises intersecting grids 14 and 16 comprised of crossing elements in the form of spaced-apart and parallel deflector blades 18 and 20, respectively. The grids 14 and 16, and the individual deflector blades 18 and 20, cross each other at an included angle that may in one embodiment be within the range of 45 to 135 degrees and in another embodiment be within the range of 60 to 120 degrees. The grids 14 and 16 and deflector blades 18 and 20 are also positioned at an angle, which is normally one-half of the included angle, with respect to the longitudinal center axis of the conduit 12.

The deflector blades 18 in each of the grids 14 are interleaved with and cross the deflector blades 16 in each of the associated intersecting grids 16. The deflector blades 18 and 20 may be in the form of rectangular strips, except that the deflector blades 18 and 20 that are positioned nearest the inner surface of the conduit 12 are shaped to conform to the shape of the inner surface of the column 12. The deflector blades 18 may be planar and the deflector blades 20 may have two planar segments 20a and 20b that are positioned in offset planes by a bent portion 20c. The offset planes may be parallel to each other.

The deflector blades 18 within each grid 14 have opposed ends 22 and 24 and opposed side edges 26 and 28. The deflector blades 20 within each grid 16 likewise have opposed ends 30 and 32 and opposed side edges 34 and 36. The side edges 26, 28 and 34, 36 of deflector blades 18 and 20, respectively, include uncut portions that join adjacent ones of the interleaved deflector blades 18 and 20 along a transverse strip 38 where the deflector blades 18 and 20 cross each other. This transverse strip 38 creates a strong integral connection between adjacent ones of the deflector blades 18 and 20 that extends across the entire width of each grid 14 and 16 and eliminates the need to position and then weld or otherwise join together individual ones of the deflectors blades 18 and 20. The side edges 26, 28 and 34, 36 include cut portions that extend from the uncut portions to the opposite ends 22, 24 and 30, 32 of the deflector blades 18 and 20, respectively.

The bent portion 20c that places the segments 20a, 20b of the deflector blade 20 in the offset planes may be in the form of an S-shaped bend 40 that incorporates the transverse strip 38. As can be seen in FIG. 3, the S-shaped bend 40 shortens the longitudinal length of the deflector blades 20 in relation to the longitudinal length of the deflector blades 18, thereby creating slit-like openings 42 between the ends 30, 32 of adjacent deflector blades 18 in the solid surface axial projection of the contacting device 10. These openings 42 and the S-shaped bend 40 in the deflector blades 20 are believed to facilitate mixing of the fluid streams when they are flowing through the contacting device 10.

Figure 4:
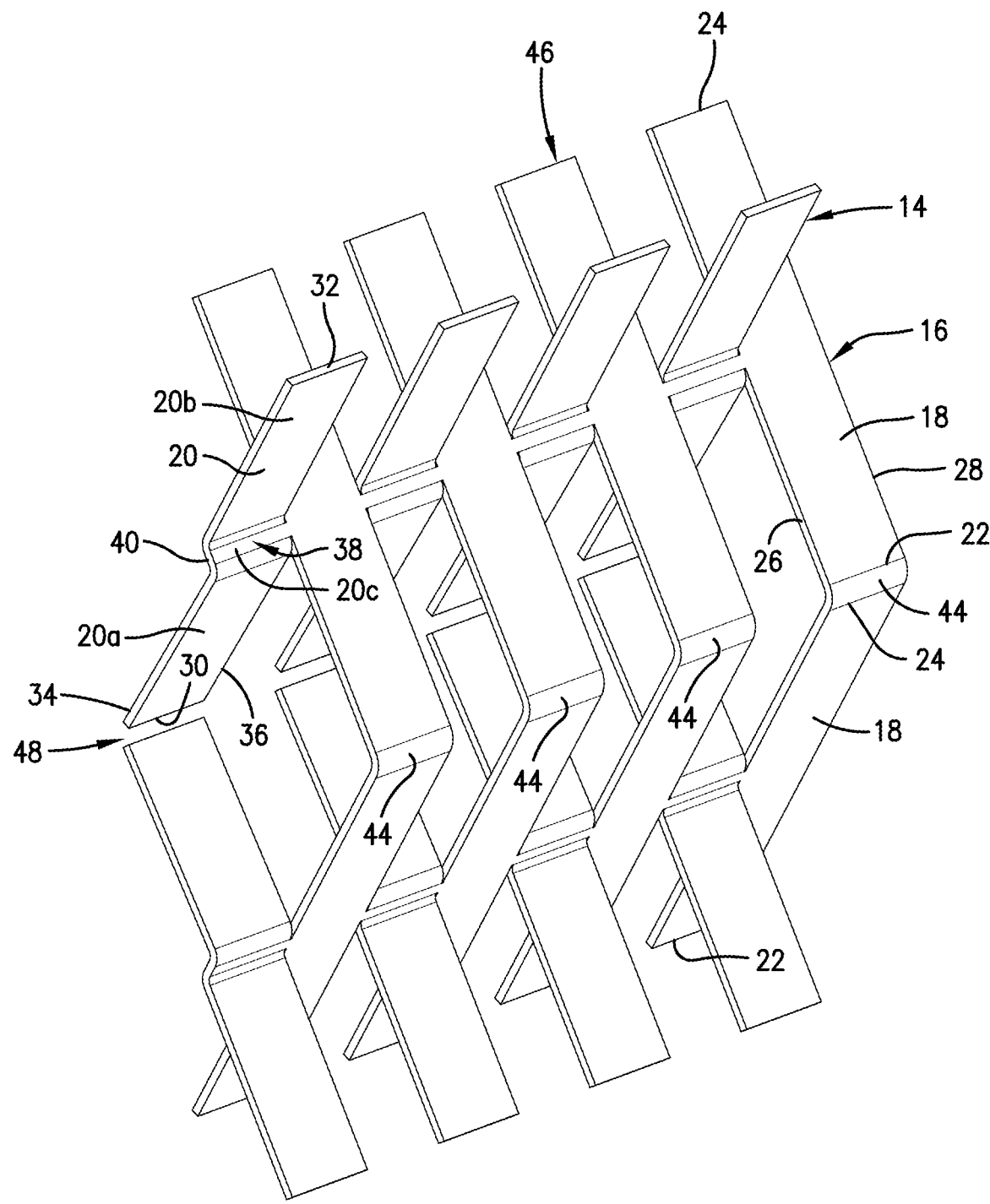
FIG. 4 is a side perspective view of one embodiment of a subassembly of the contacting device.
Figure 5:
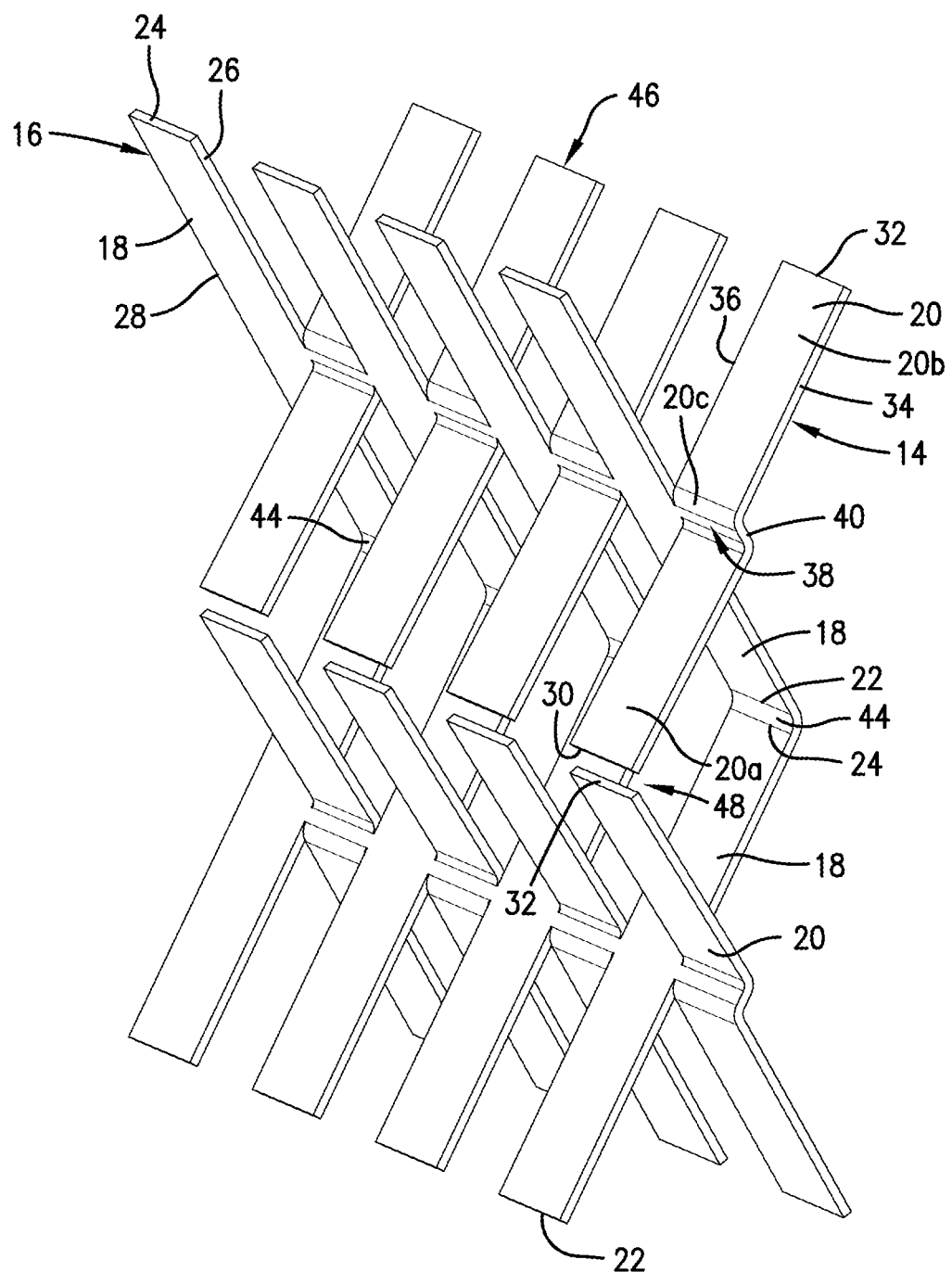
FIG. 5 is a side perspective view of the subassembly of the contacting device taken from an opposite side from the view shown in FIG. 4.

In each pair of intersecting grids 14 and 16, the end 24 of each one of the deflector blades 18 is uncut and is joined to a similarly uncut end 22 of one of the deflector blades 18 in another one of the intersecting pairs of grids 14 and 16 along a reverse bend 44 that aligns one of the pairs of intersecting grids 14 and 16 with another one of the pairs of intersecting grids 14 and 16 to form a contacting device subassembly 46 as shown in FIGS. 4 and 5. In another embodiment, the end 24 of only some of the deflector blades 18 is uncut and is joined to a similarly uncut end 22 of one of the deflector blades 18 in another one of the intersecting pairs of grids 14 and 16 along the reverse bend 44 to form the contacting device subassembly 46.

The interconnected uncut ends 24 and 22 of the deflector blades 18 creates a strong integral connection that eliminates the need to position and then weld together the ends 24 and 22 of individual deflector blades 18. Each deflector blade 18 is shown as having one cut end 22 or 24. In another embodiment the cut end 22 or 24 is replaced by an uncut end 22 or 24 that is then connected to an uncut end 22 or 24 of the deflector blades 18 in a further one of the intersecting pairs of grids 14 and 16 along another one of the reverse bends 44 so that three of the intersecting pairs of grids 14 and 16 are aligned with each other. Additional intersecting pairs of grids 14 and 16 can be joined in this manner.

Figure 6:
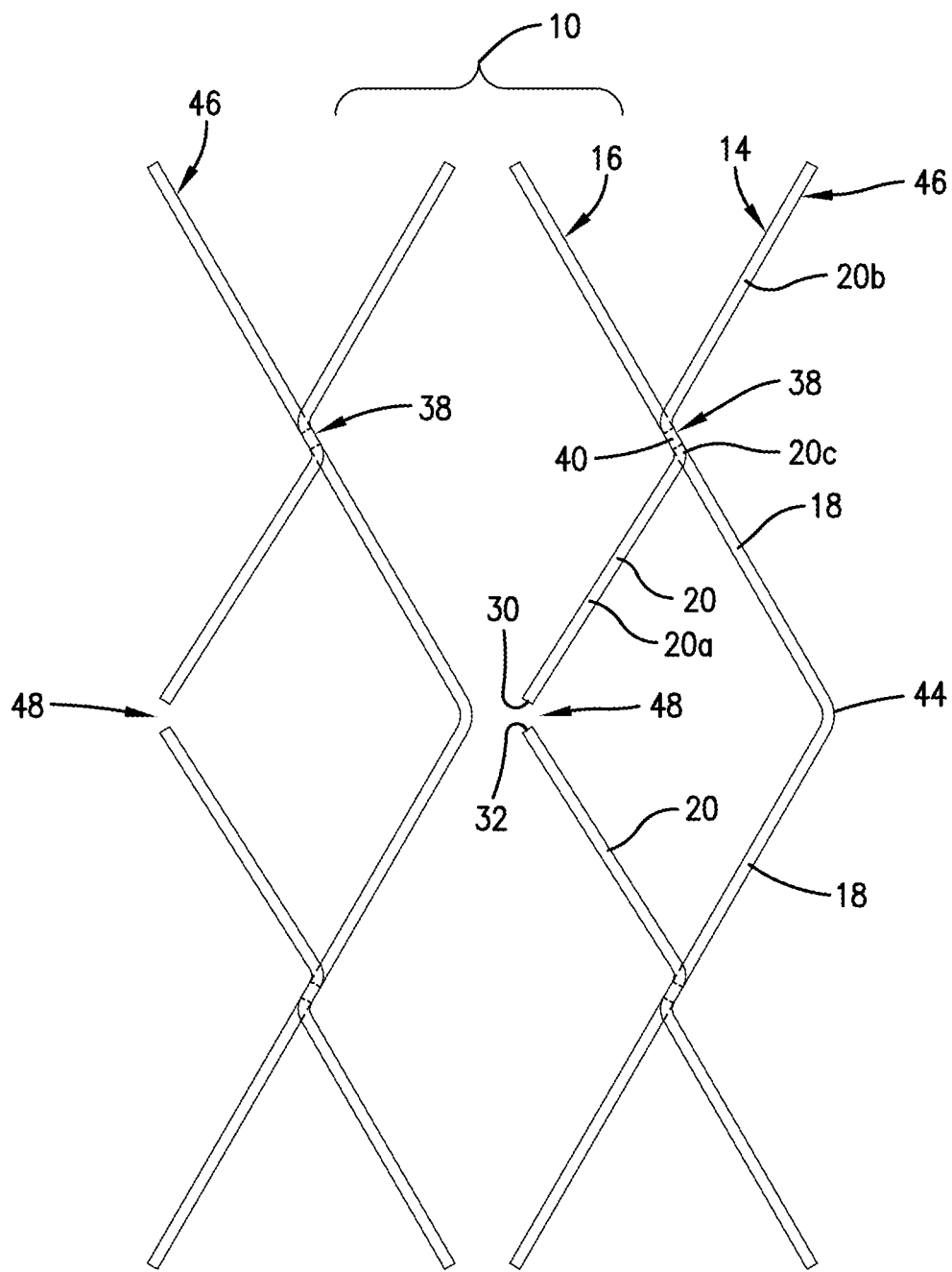
FIG. 6 is an end elevation view of two of the contacting device subassemblies prior to being joined together to form the contacting device.

In one embodiment of the contacting device subassembly 46, the end 32 of each deflector blade 20 in the grid 16 is spaced from the end 30 of the longitudinally-aligned deflector blade 20 in the adjacent grid 16 to create a gap 48. As illustrated in FIG. 6, the gap 48 may be sized to receive at least some of the reverse bend 44 at the uncut ends 22, 24 of the deflector blades 18 in another of the contacting device subassemblies 46 so that the ends 32, 30 of the deflector blades 20 may be welded or otherwise secured to the uncut ends 22, 24 of the deflector blades 18 to join the two contacting device subassemblies 46 together to form at least part of the assembled contacting device 10. Additional contacting devices subassemblies 46 can be joined together in this manner.

Figure 7:
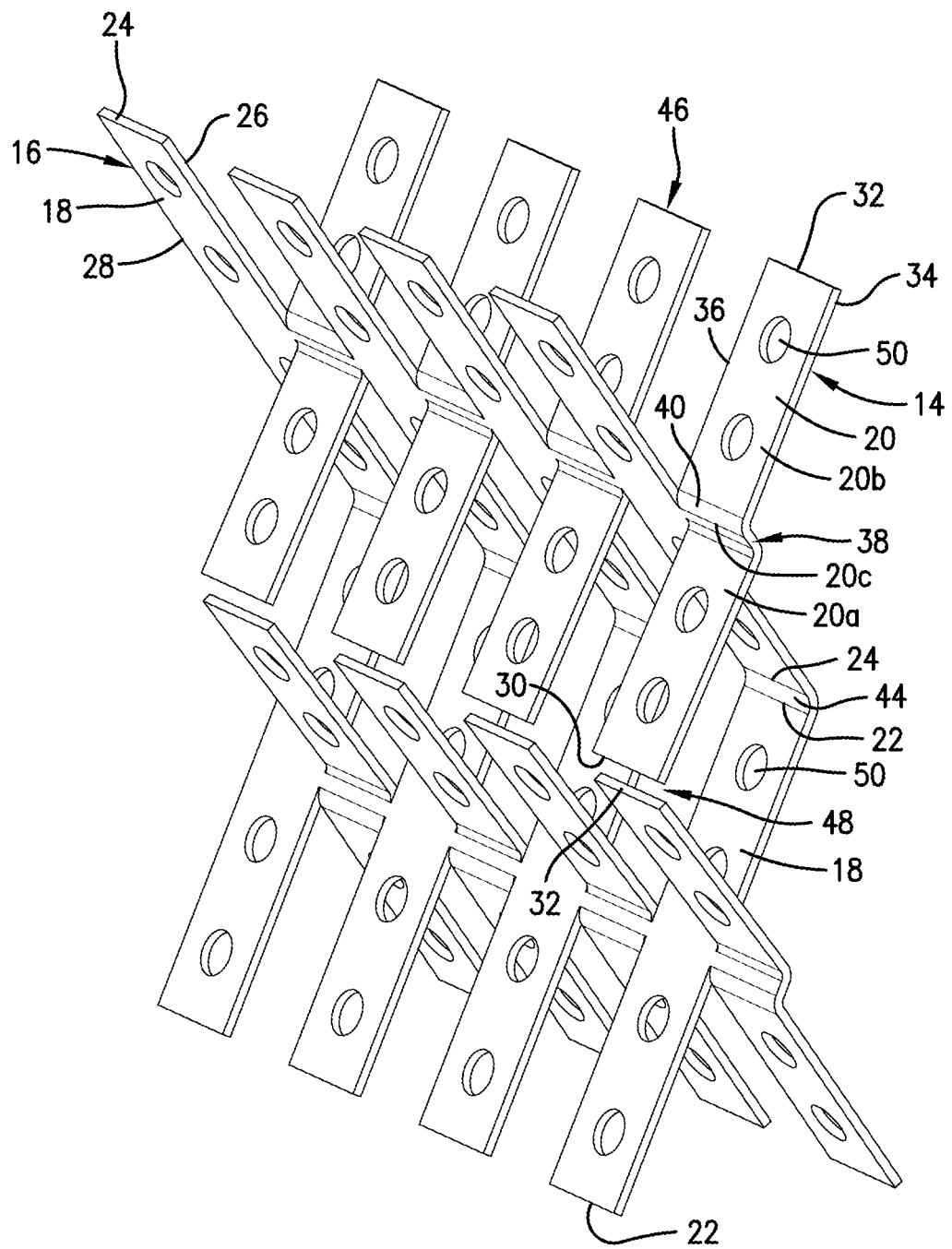
FIG. 7 is a side perspective view of a second embodiment of the contacting device subassembly that incorporates apertures in deflector blades.

In some embodiments of the contacting device subassemblies 46, as shown in FIG. 7, some or all of the deflector blades 18 and/or some or all of the deflector blades 20 may include apertures 50 that allow portions of the fluid streams to pass through the deflector blades 18 and/or 20 to facilitate mixing of the fluid streams when flowing countercurrently through the assembled contacting device 10.

Figure 12:
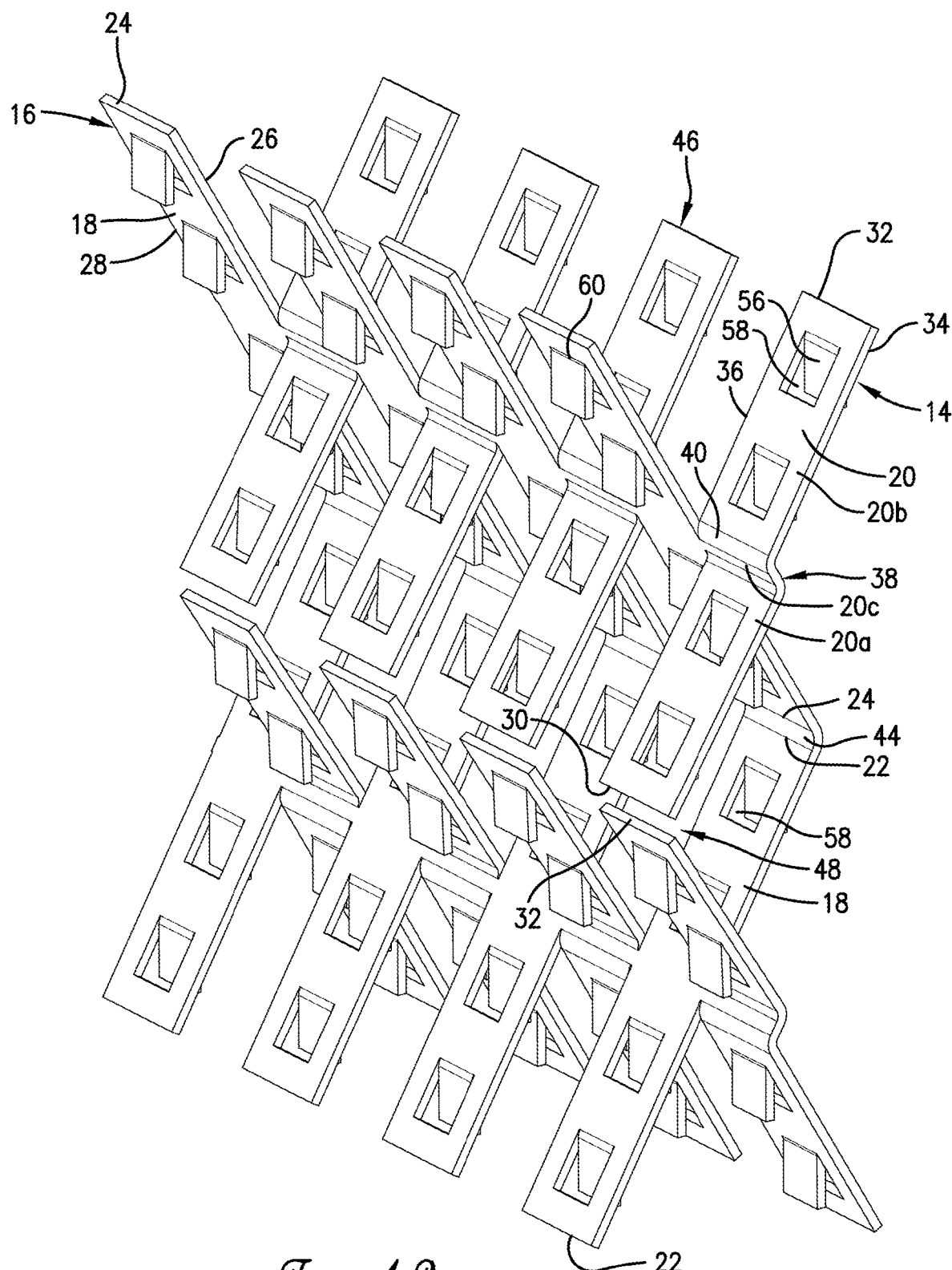
FIG. 12 is a side perspective view of a fourth embodiment of a contacting device subassembly that includes apertures and directional tabs in the deflector blades.
Figure 13:
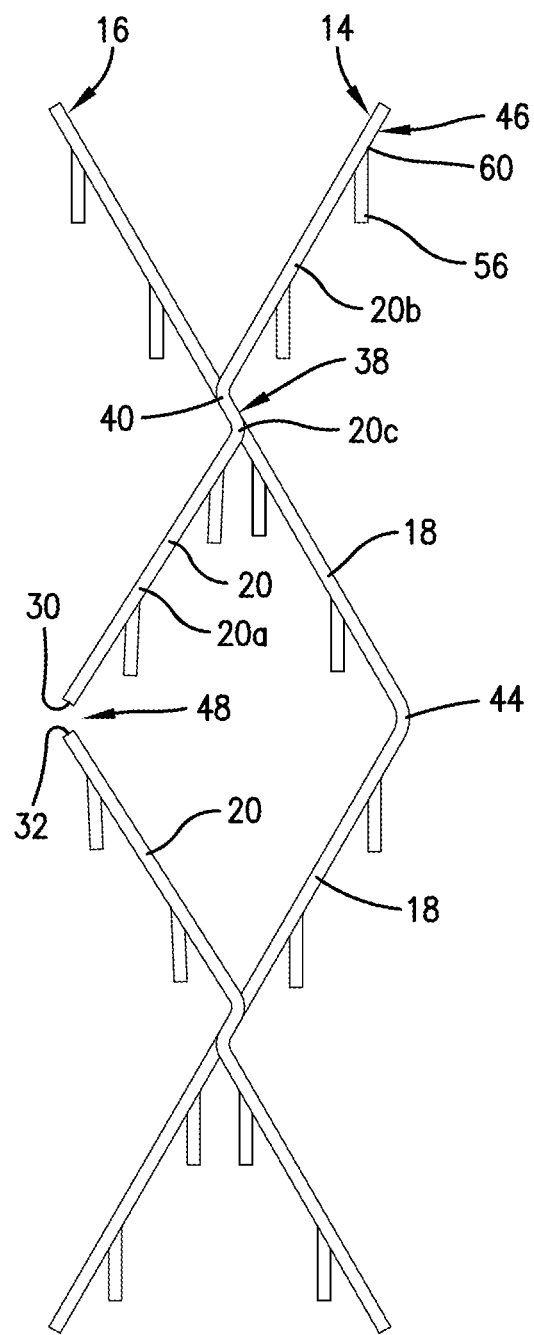
FIG. 13 is an edge elevation view of the fourth embodiment of the contacting device subassembly.
Figure 14:
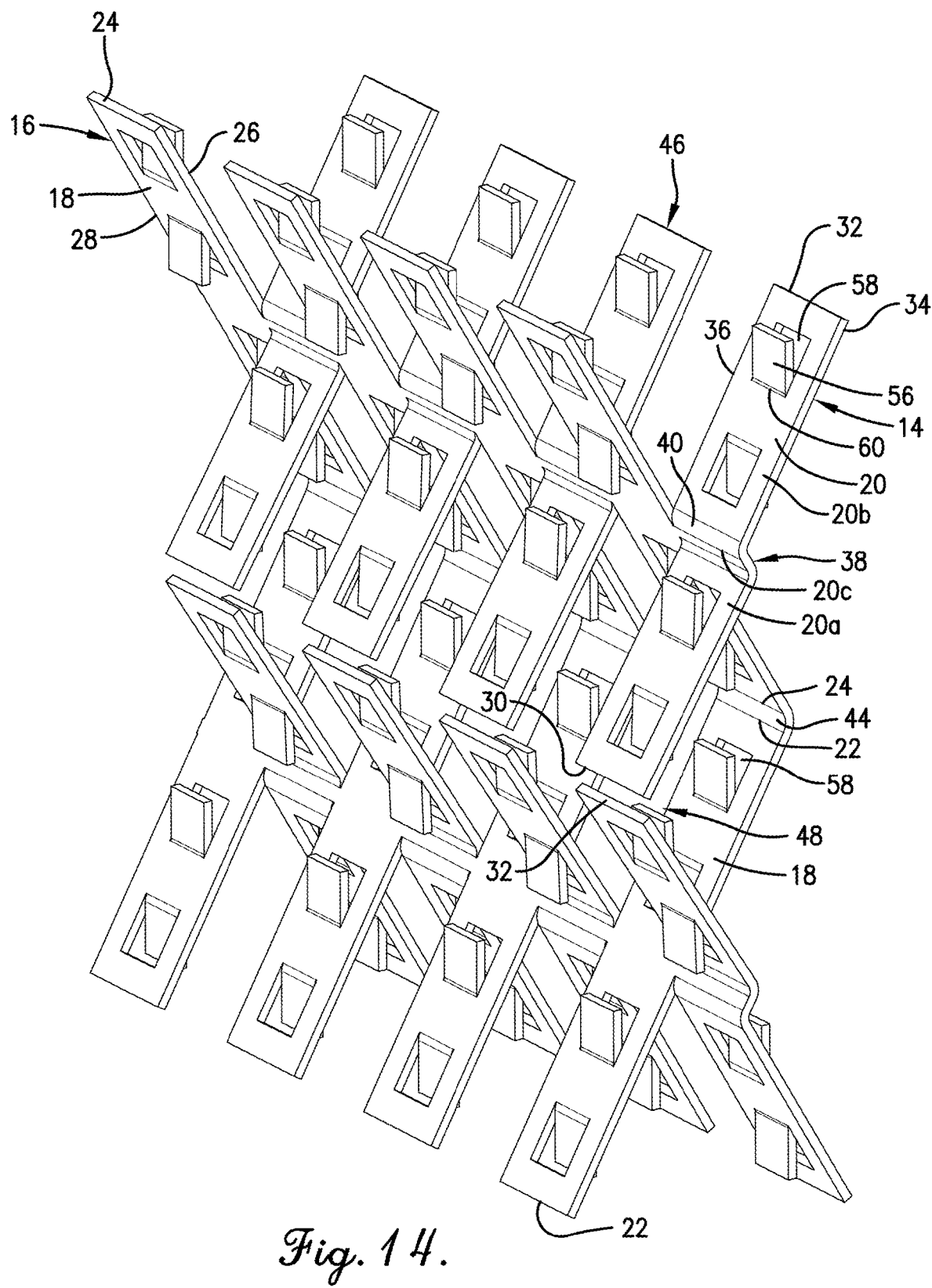
FIG. 14 is a side perspective view of a fifth embodiment of a contacting device subassembly that includes apertures and directional tabs in the deflector blades.
Figure 15:
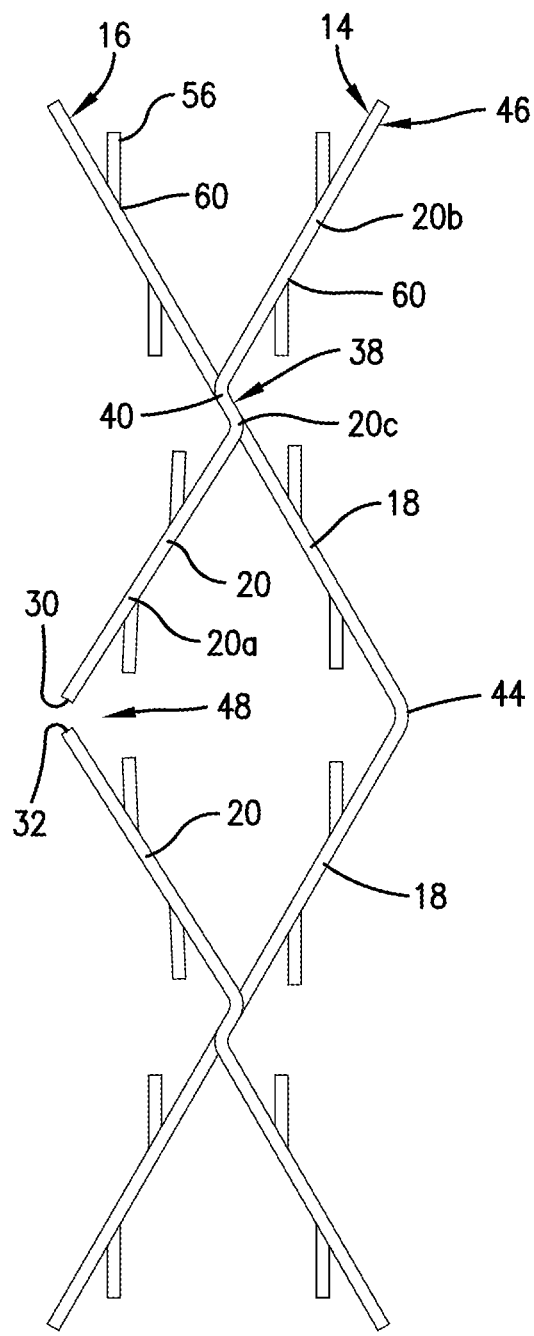
FIG. 15 is an edge elevation view of the fifth embodiment of the contacting device subassembly.

In other embodiments of the contacting device subassemblies 46, as shown in FIGS. 10-21, some or all of the deflector blades 18 and/or some or all of the deflector blades 20 may include a plurality of directional tabs 56, each of which is positioned in overlying relationship to an aperture 58 formed in the deflector blade 18 and/or 20. The apertures 58 function like the previously-described apertures 50 to allow portions of the fluid streams to pass through the deflector blades 18 and/or 20 to facilitate mixing of the fluid streams, while the directional tabs 56 further facilitate mixing of the fluid streams by either facilitating entry of the fluid stream into the associated apertures 58 and/or by redirecting the fluid stream as it exits from the associated apertures 58. The directional tabs 56 in some embodiments, such as shown in FIGS. 10, 11 and 16-21, may be oriented such that they extend upwardly from the plane of the associated deflector blades 18 and/or 20. In other embodiments, such as shown in FIGS. 12 and 13, the directional tabs 56 may be oriented so that they extend downwardly from the plane of the associated deflector blades 18 and/or 20. In still other embodiments, such as shown in FIGS. 14 and 15, some directional tabs 56 may extend downwardly while other directional tabs 56 extend upwardly on the same deflector blades 18 and/or 20.

In general, when the directional tabs 56 are extending upwardly, they facilitate redirecting fluid streams that are descending along the upper surfaces of the deflector blades 18 and/or 20 into and then through the associated apertures 58 to return the fluid streams to open zones where the desired intermixing with the ascending fluid stream may occur. When the directional tabs 56 are extending downwardly, they facilitate redirection of fluid streams that are ascending along the undersurfaces of the deflector blades 18 and/or 20 into and through the associated apertures 58 to return the fluid streams to the open zones to facilitate the desired intermixing with the descending fluids streams.

Figure 22:
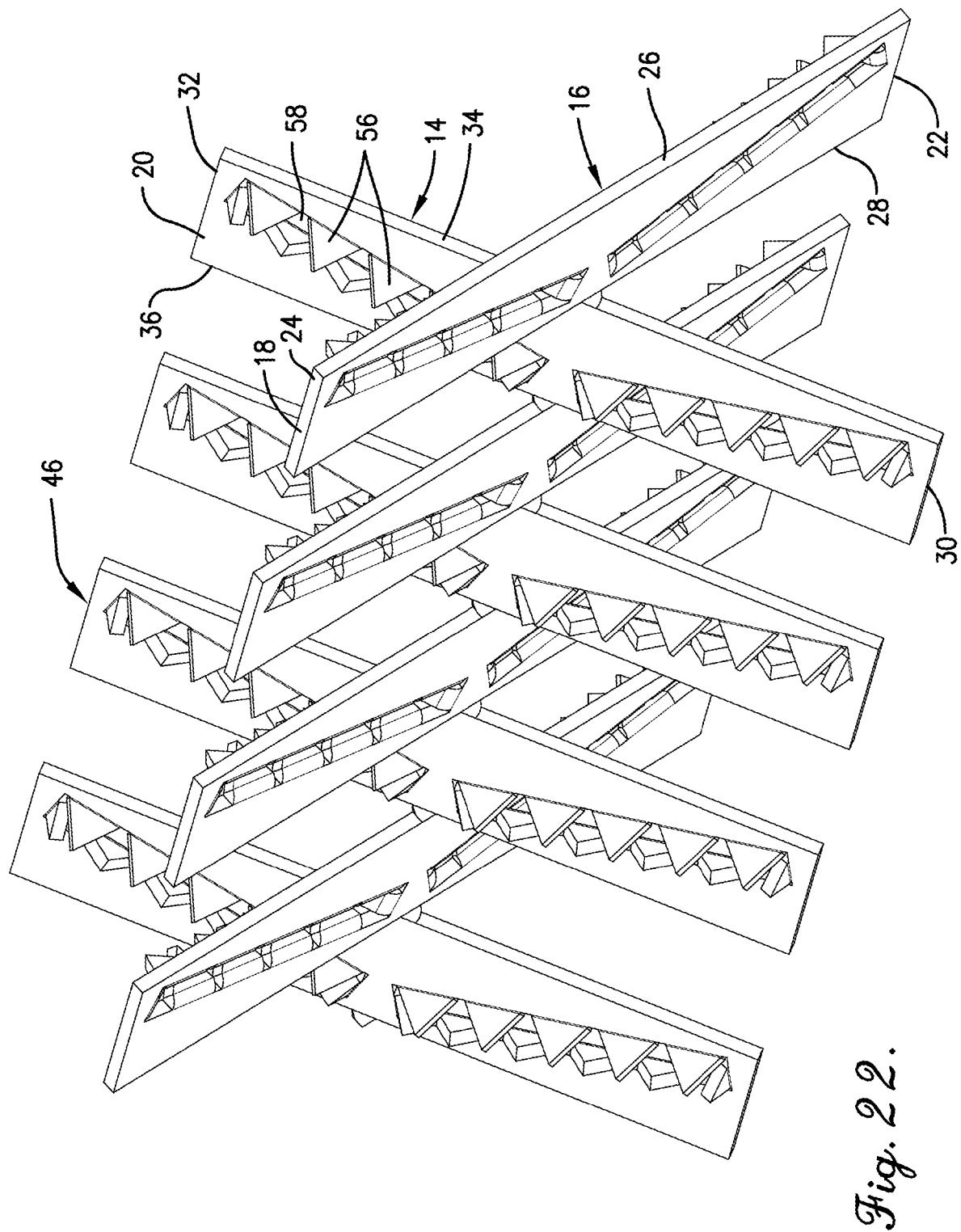
FIG. 22 is a side perspective view of an eighth embodiment of a contacting device subassembly that includes multiple directional tabs associated with each aperture in the deflector blades.
Figure 23:
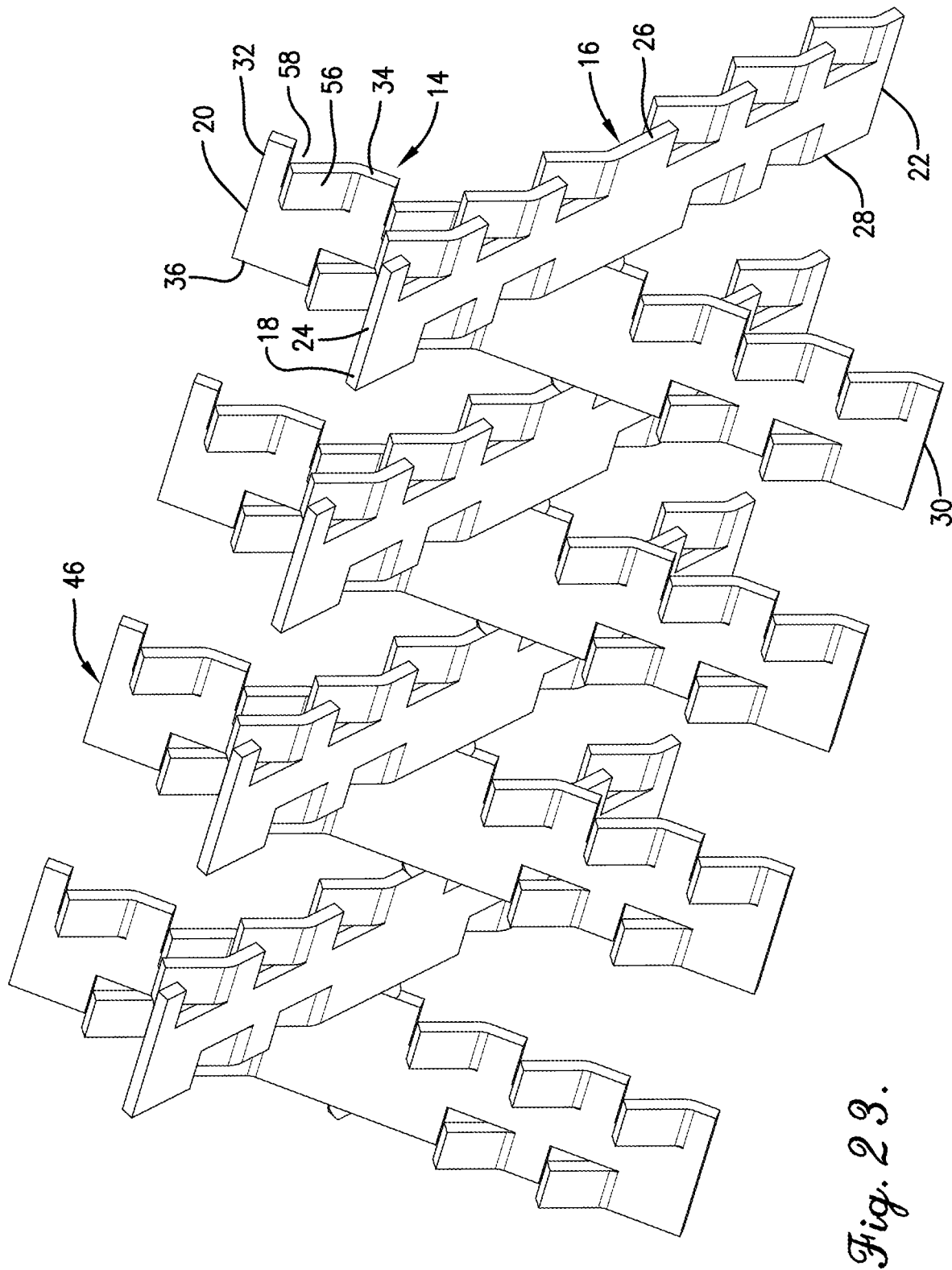
FIG. 23 is a side perspective view of a ninth embodiment of a contacting device subassembly that includes apertures and directional tabs formed in side edges of the deflector blades.
Figure 24:
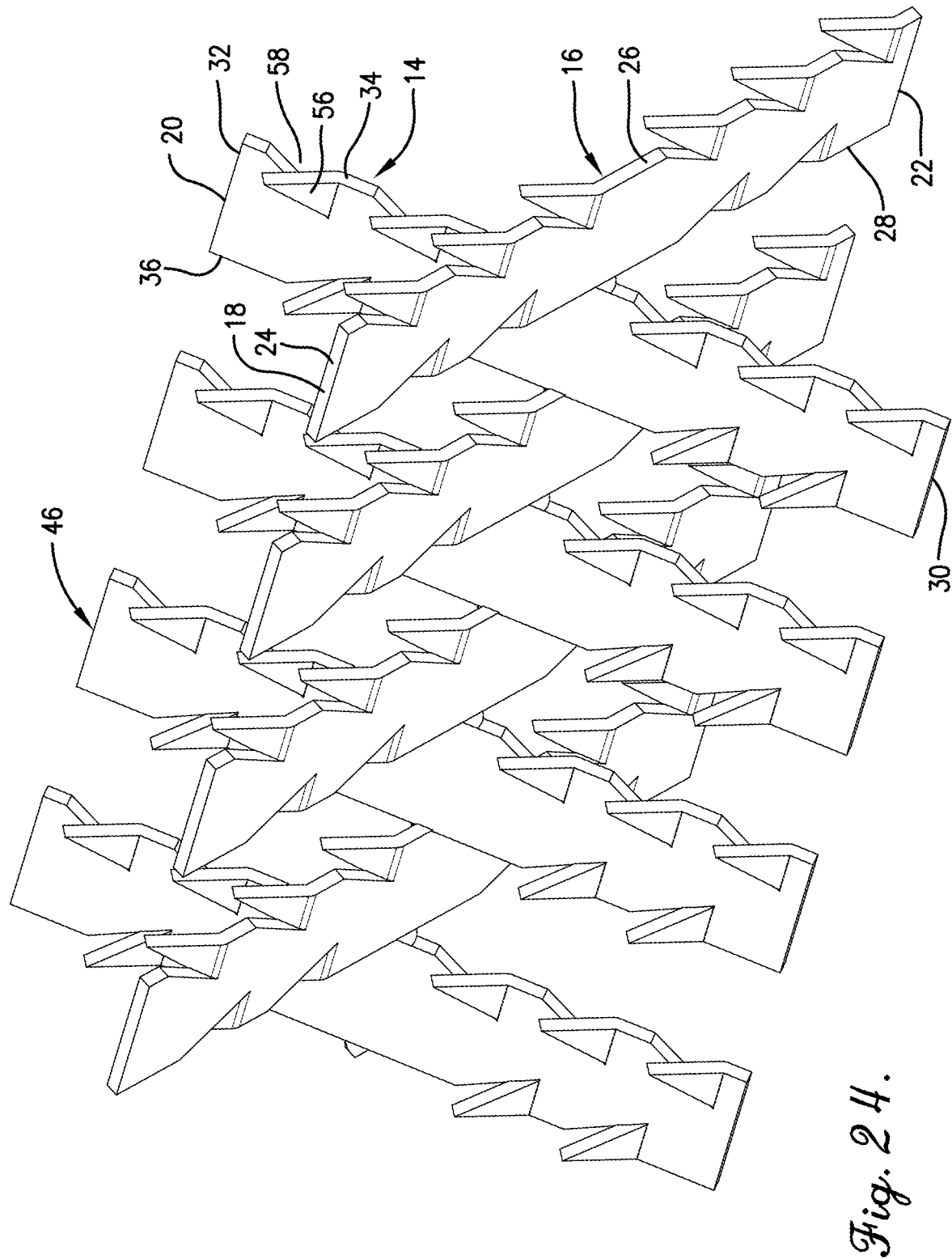
FIG. 24 is a side perspective view of a tenth embodiment of a contacting device subassembly that includes apertures and directional tabs formed in side edges of the deflector blades.

The size, shape, number and positioning of the directional tabs 56 and the apertures 58 in the deflector blades 18 and/or 20 can be varied to suit particular applications. In some embodiments, such as shown in FIGS. 10-17 and 23, the directional tabs 56 and the apertures 58 may be of square or rectangular shape. In other embodiments as shown in FIG. 24, the directional tabs 56 and apertures 58 may be of triangular shape. In still other embodiments, such as shown in FIGS. 18-21, the directional tabs 56 may be of a dome-shaped construction while the apertures 58 are of square, rectangular, circular or other shape. In further embodiments as shown in FIG. 22, multiple directional tabs 56 may be associated with a single one of the apertures 58. In the embodiment of the contacting device subassembly 46 shown in FIG. 22, the directional tabs 56 are triangular in shape and extend upwardly along the perimeter of the rectangular aperture 58. In other variations, the triangular directional tabs 56 may extend downwardly along the perimeter of the rectangular apertures 58 or some of the triangular directional tabs 56 may extend upwardly while others extend downwardly. The rectangular apertures 58 are shown in FIG. 22 extending at oblique angles to the longitudinal center line of the deflector blades 18 and 20.

In the embodiments of the contacting device subassemblies 46 shown in FIGS. 10-17 and 22-24, each directional tab 56 is constructed by cutting slits in the deflector blade 18 or 20 to form all but one edge of the directional tab 56 and then bending the directional tab 56 out of the plane of the deflector blade 18 or 20 to form the associated aperture 58. The directional tab 56 remains connected to the deflector blade 18 or 20 along its uncut edge 60 and extends at a preselected angle to the plane of the deflector blade 18 or 20. The preselected angle can be varied depending upon the particular application in which the contacting device 10 is intended to be used. In some embodiments, the preselected angle may be in the range of 5 to 65 degrees, while in other embodiments the preselected angle may be in the range of 10 to 45 degrees.

In other embodiments of the contacting device subassemblies 46, each directional tab 56 may be formed separately from the associated aperture 58 by welding or otherwise securing a separate directional tab 56 to the deflector blade 18 or 20 in spaced and at least partially covering relationship to the aperture 58, such as shown in FIGS. 18-21. Using a separate directional tab 56 in this fashion allows greater flexibility in the sizing and shaping of the directional tab 56 in relationship to the associated aperture 58.

Figure 16:
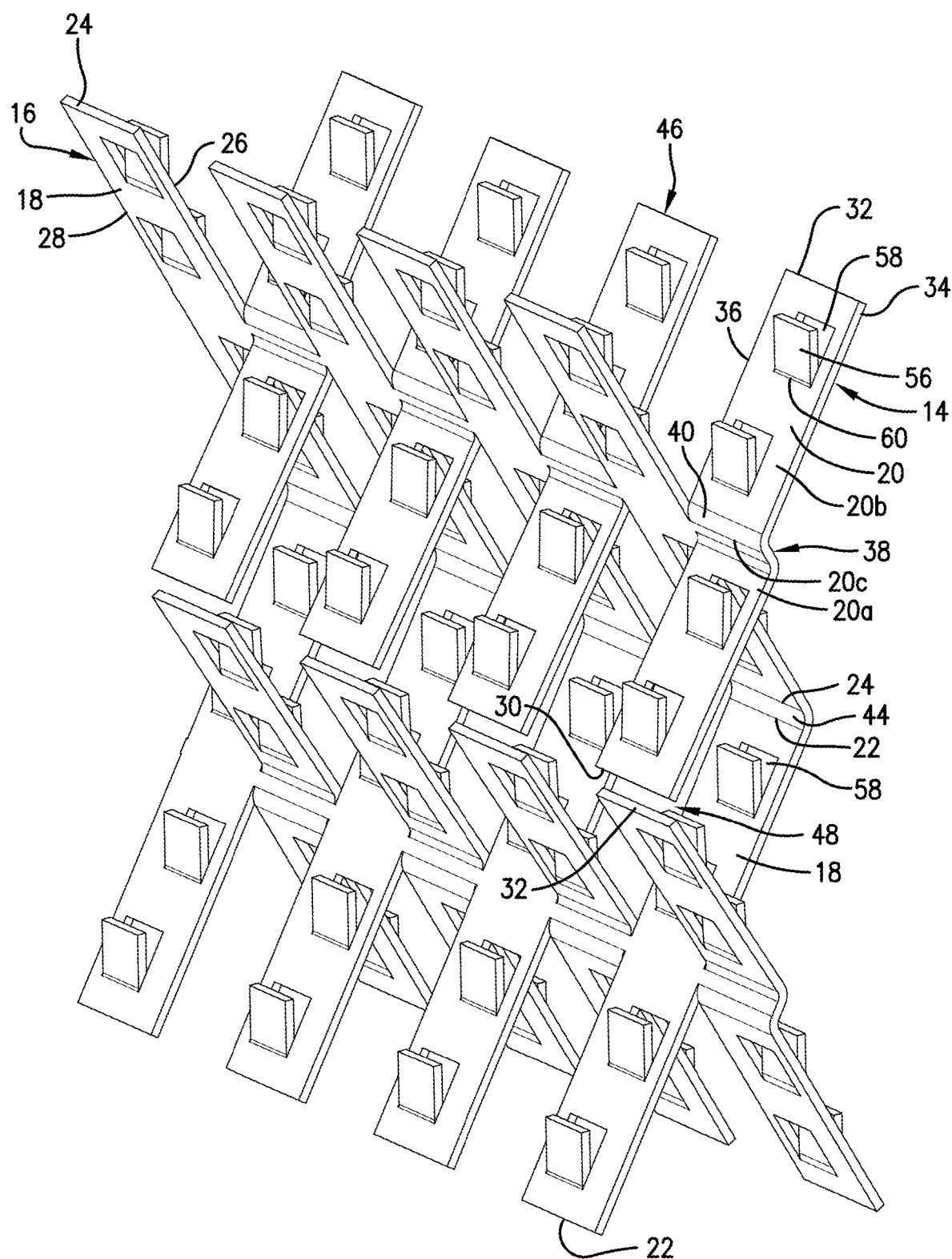
FIG. 16 is a side perspective view of a sixth embodiment of a contacting device subassembly that includes apertures and directional tabs in the deflector blades.
Figure 17:
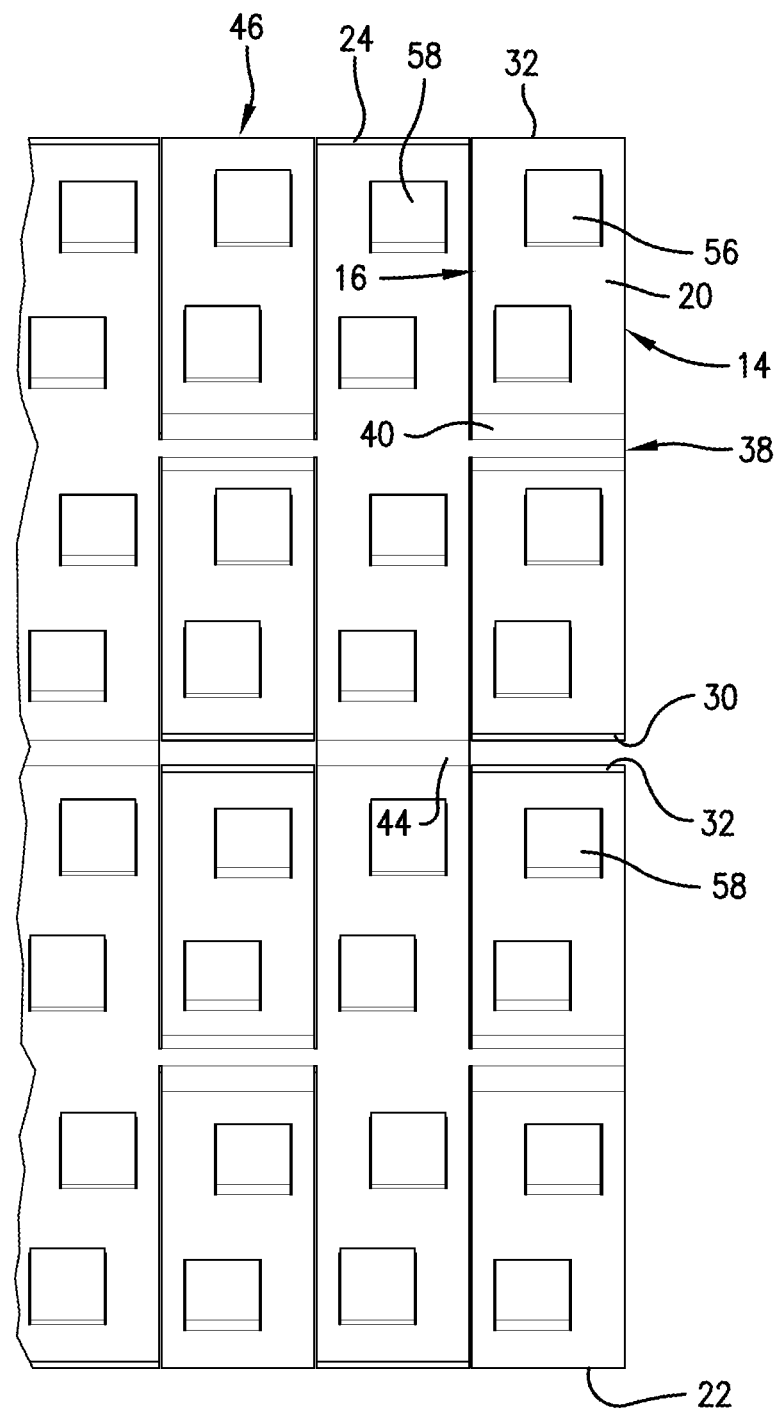
FIG. 17 is an edge elevation view of the sixth embodiment of the contacting device subassembly.
Figure 18:
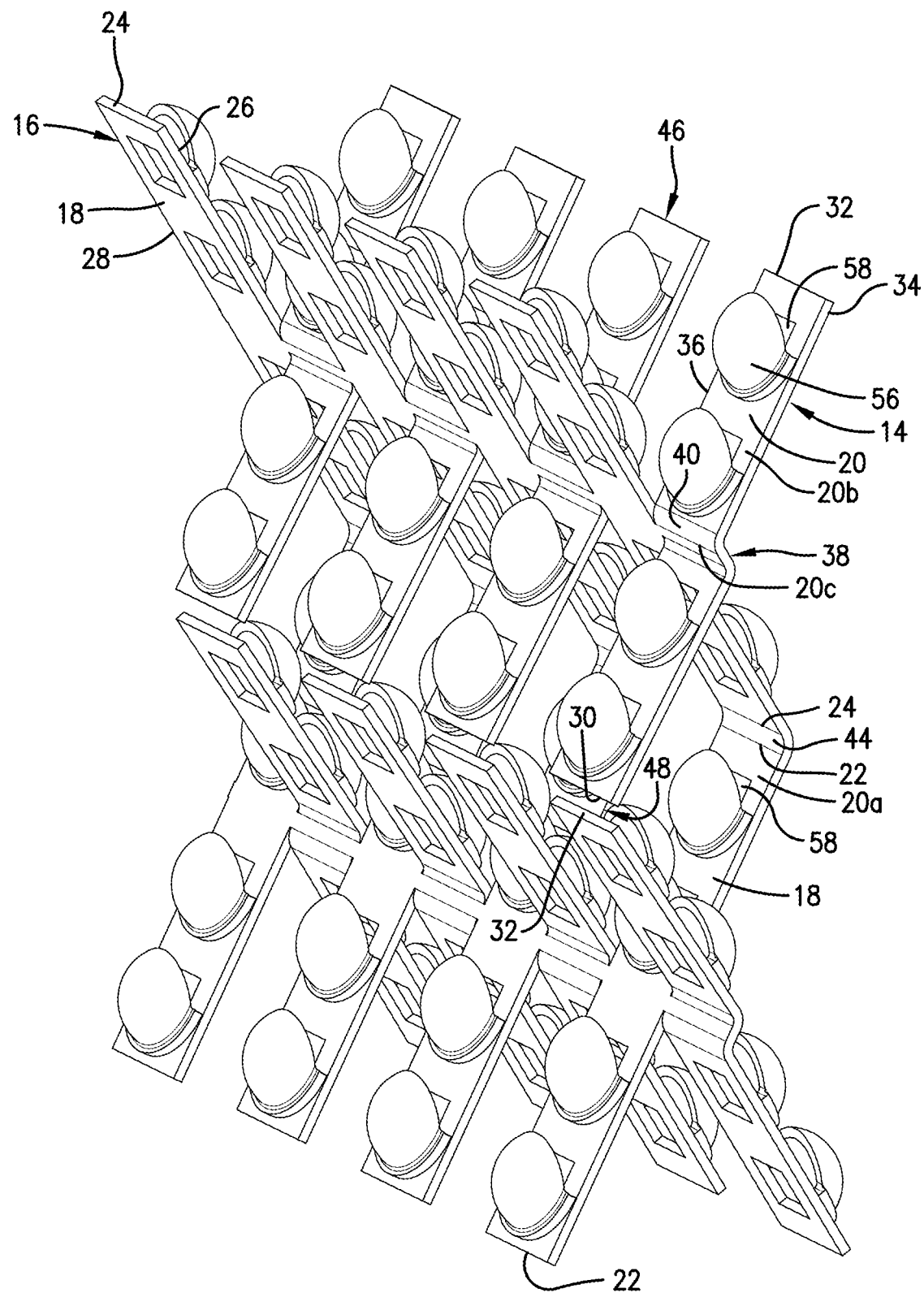
FIG. 18 is a side perspective view of a seventh embodiment of a contacting device subassembly that includes apertures and directional tabs in the deflector blades.
Figure 19:
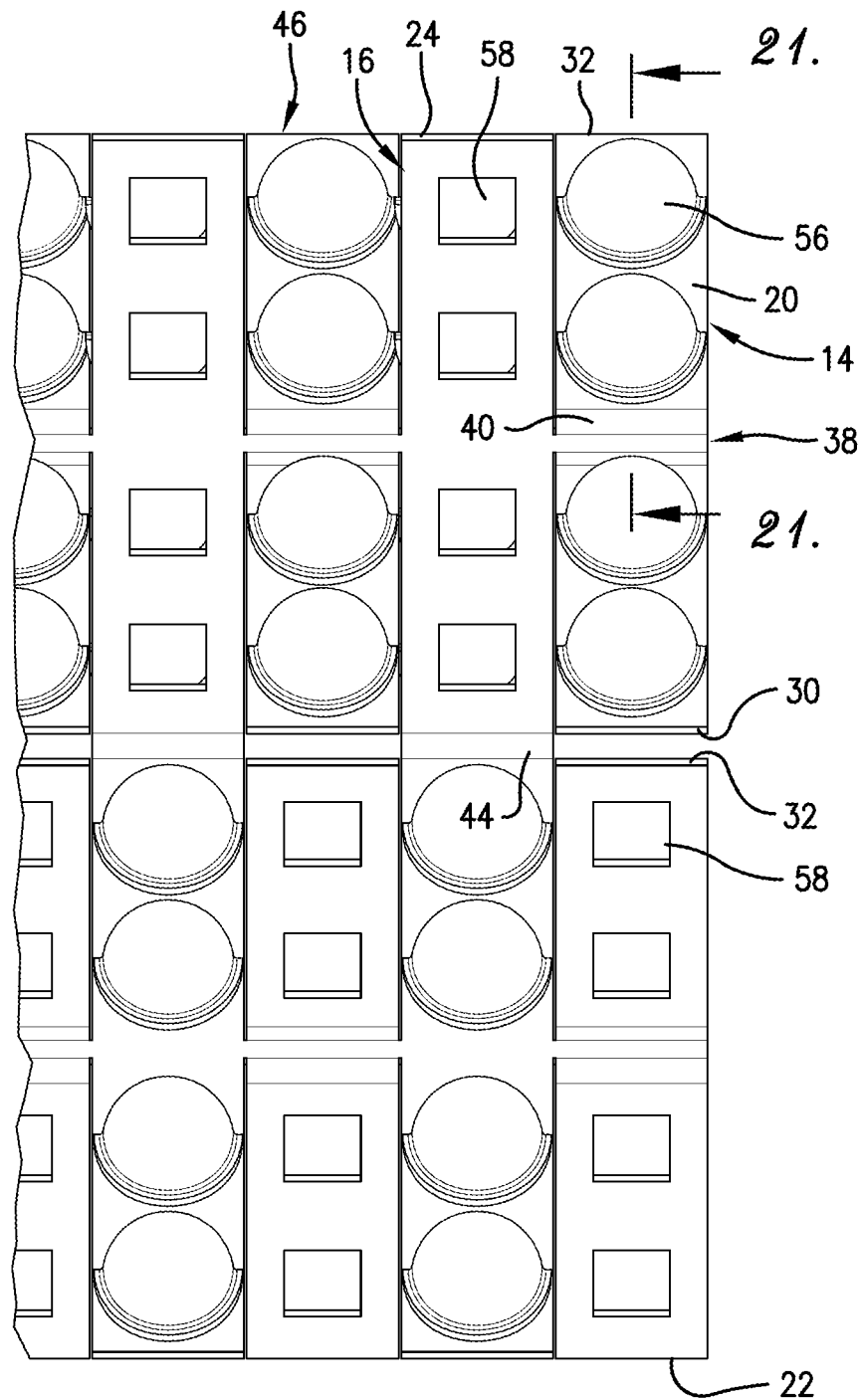
FIG. 19 is a side elevation view of the seventh embodiment of the contacting device subassembly.
Figure 20:
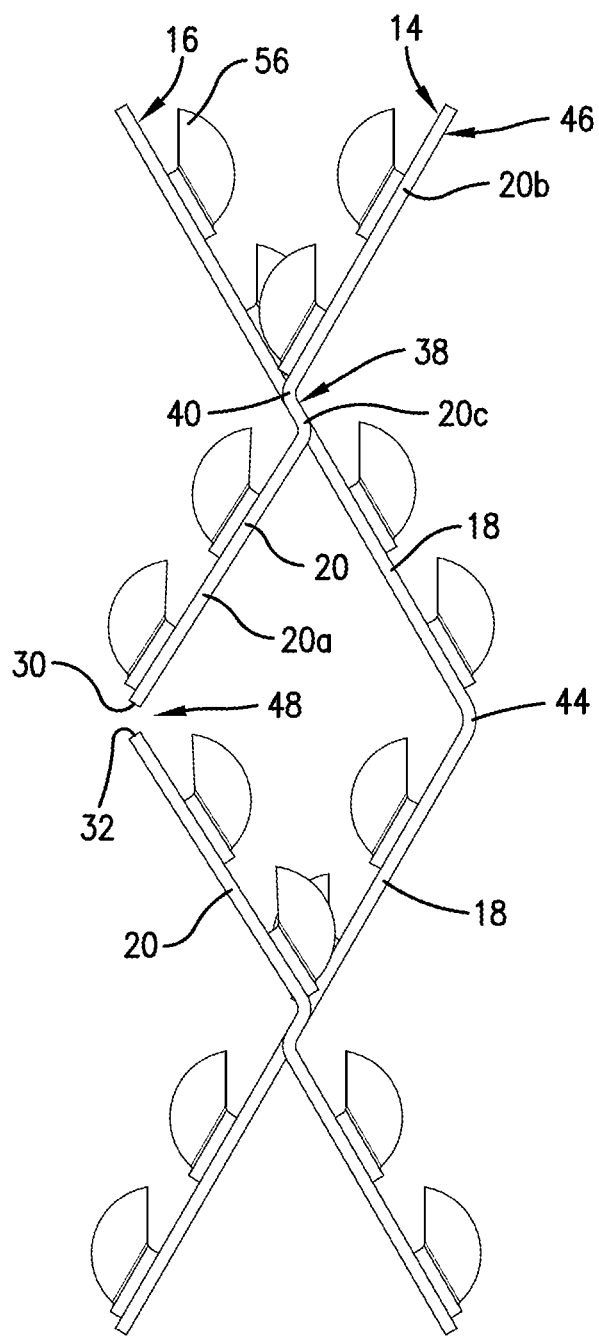
FIG. 20 is an edge elevation view of the seventh embodiment of the contacting device subassembly.
Figure 21:
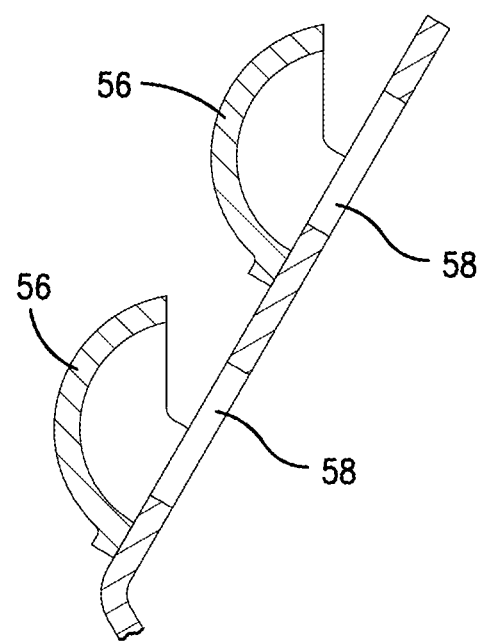
FIG. 21 is a fragmentary edge elevation view of one deflector blade of the seventh embodiment of the contacting device subassembly taken along line 21-21 of FIG. 19 in the direction of the arrows and shown on an enlarged scale.

The directional tabs 56 and apertures 58 may be centrally positioned on the longitudinal center lines of the deflector blades 18 and/or 20 as shown in FIGS. 10-15 and 18-21, or they may be offset from the longitudinal center lines such as shown in FIGS. 16 and 17 where adjacent ones of the directional tabs 56 and apertures 58 are arranged in a staggered fashion in relation to the longitudinal center lines. In other variations, the directional tabs 56 and apertures 58 may be positioned at the side edges 26, 28, 34, 36 of the deflector blades 18 and/or 20 as shown in FIGS. 23 and 24 or the apertures 58 may extend obliquely to the longitudinal center lines as shown in FIG. 22.

It will also be appreciated that the deflector blades 18 and 20 of the contacting device subassemblies 46 containing the directional tabs 56 and apertures 58 may be of various constructions. For example, the deflector blades 18 and 20 of the contacting device subassemblies 46 shown in FIGS. 10-21 are as previously described, while the deflector blades 18 and 20 of the contacting device subassemblies 46 shown in FIGS. 22-24 lack some of the described features. For example, the deflector blades 20 in those embodiments lack the S-shaped bend 40 and the ends 24 of the deflector blades 18 are not uncut and joined to the uncut ends 24 of other deflector blades 18 in another one of the intersecting pairs of grids 14 and 16 along a reverse bend 44.

Figure 8:
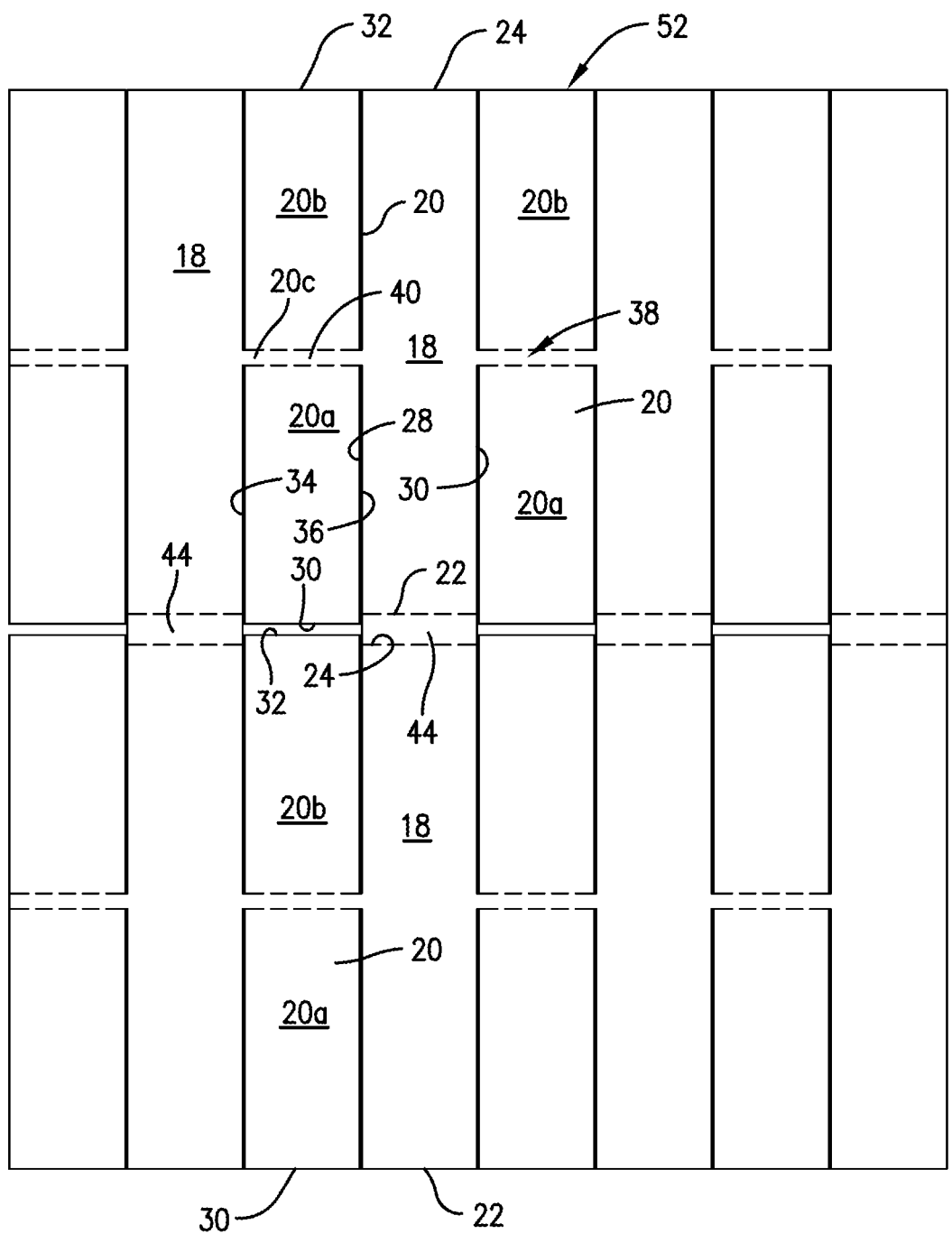
FIG. 8 is a front elevation view of a blank with a series of fold and cut lines that may be used to form a contacting device.
Figure 9:
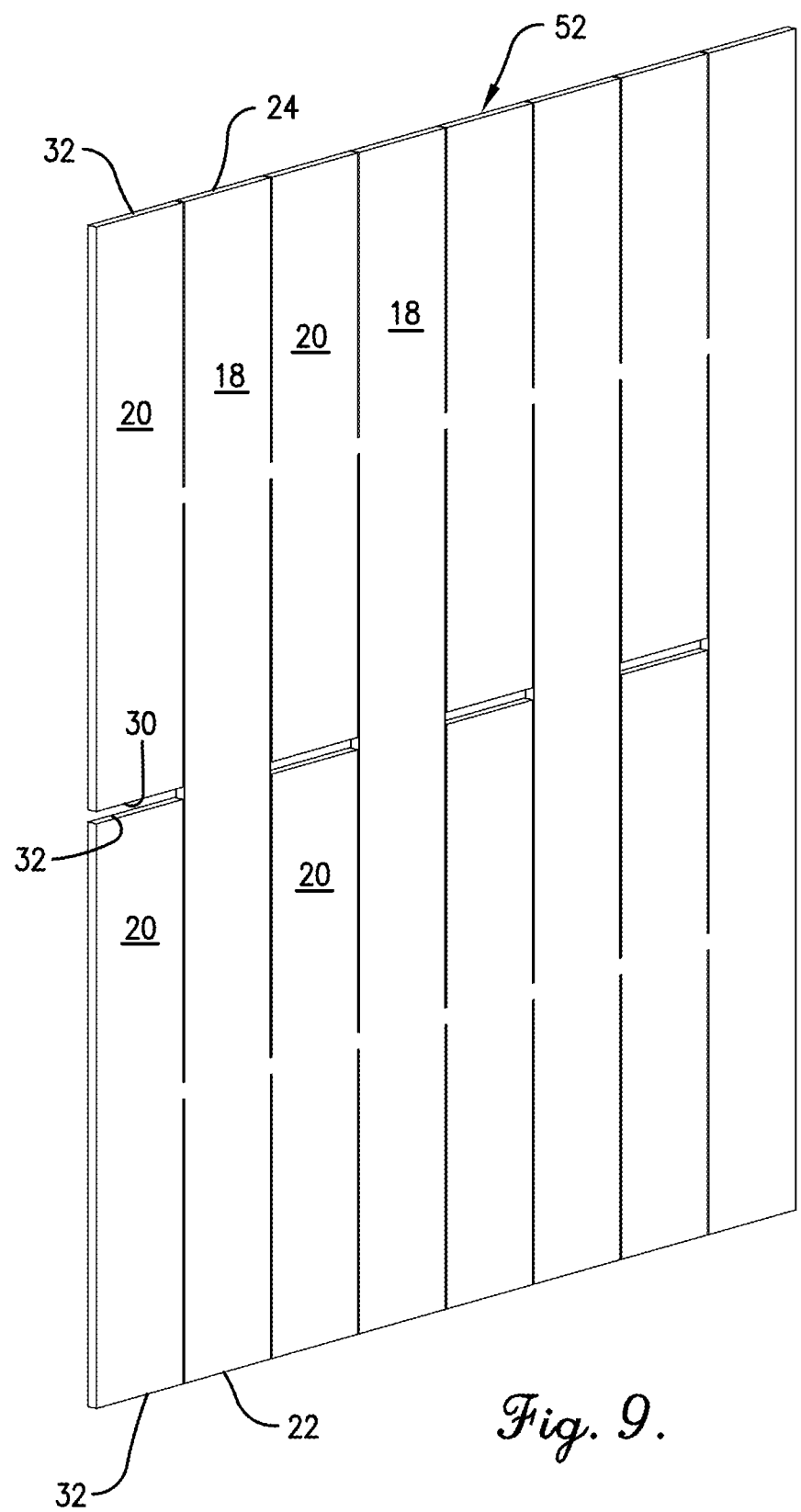
FIG. 9 is a perspective view of the blank shown in FIG. 8.
Figure 10:
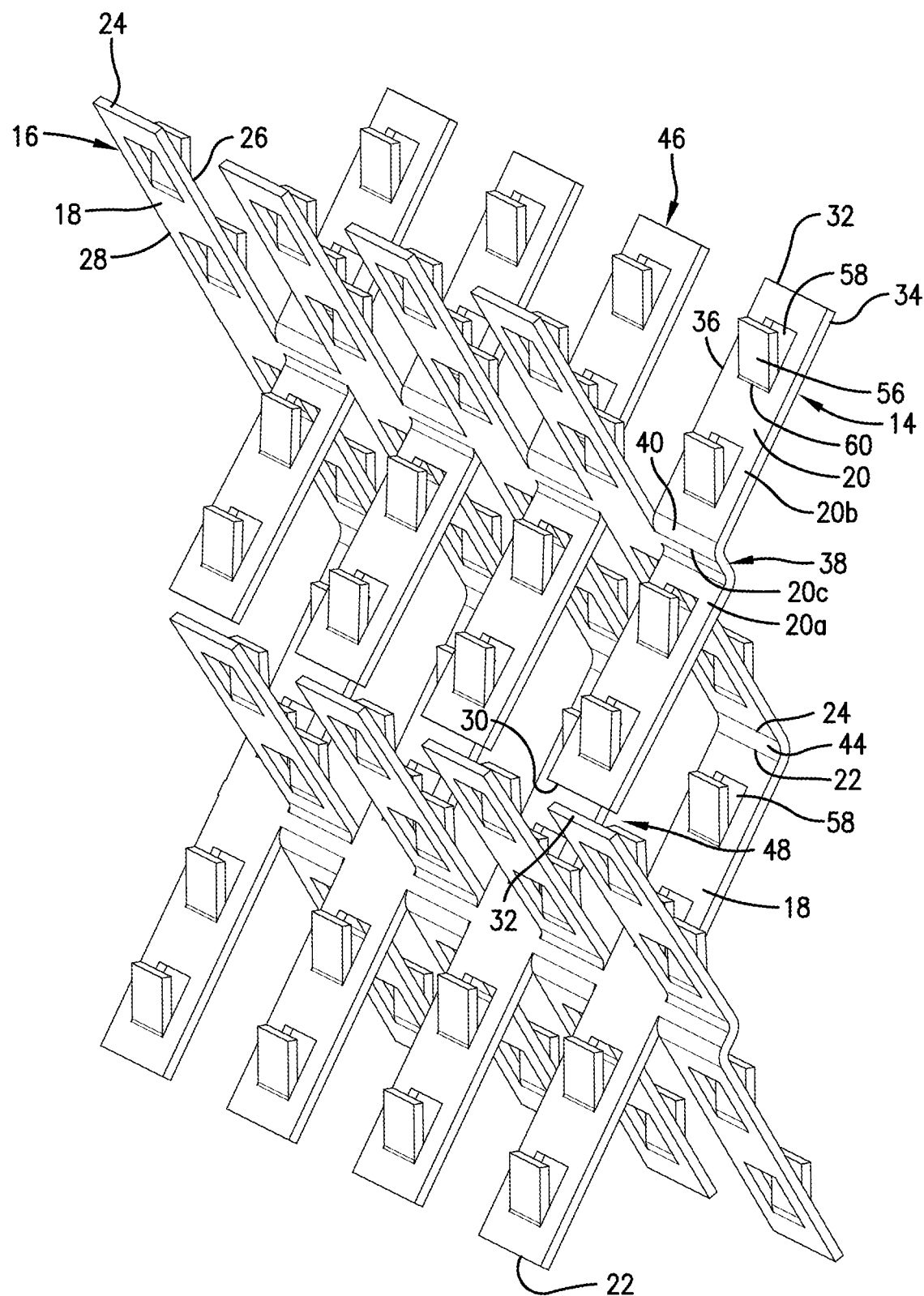
FIG. 10 is a side perspective view of a third embodiment of the contacting device subassembly that includes apertures and directional tabs in the deflector blades.
Figure 11:
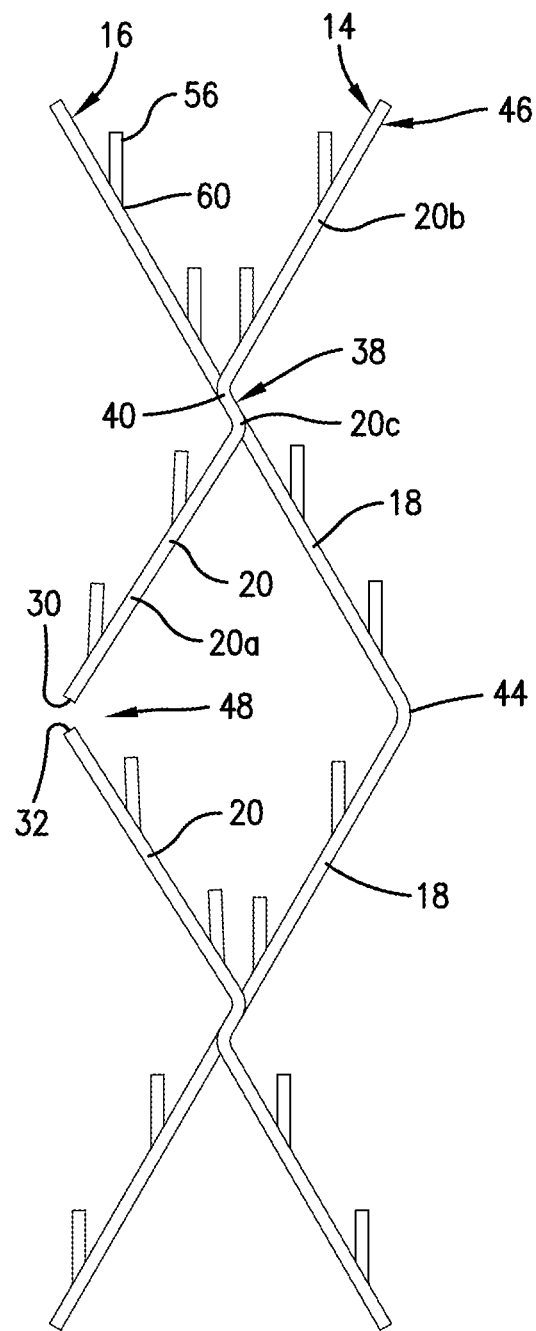
FIG. 11 is an edge elevation view of the third embodiment of the contacting device subassembly.

Turning now to FIGS. 8 and 9, a blank 52 in the form of a planar sheet of a material, such as a metal or an alloy, from which one of the contacting device subassemblies 46 is formed is illustrated. The blank 52 has been cut to form the cut ends 22, 24 and cut portions of the sides 26, 28 of the deflector blades 18, as well as the cut ends 30, 32 and the cut portions of the sides 34, 36 of the deflector blades 20. The S-shaped bends 40 to be formed in the deflector blades 20 and the reverse bends 44 to be formed between the ends 24 and 22 of longitudinally-adjacent deflector blades 18 are shown by broken lines. After cutting the planar sheet of material to form the blank 52, the contacting device subassembly 46 is then formed by bending the blank 52 at the locations of the S-shaped bends 40 and the reverse bends 44. Because side-ways adjacent ones of the deflector blades 18 and 20 are integrally joined together at the uncut portions of their sides 26, 28 and 34, 36 along the transverse strip 38 and the longitudinally-adjacent ones of the deflector blades 18 are integrally joined together at their uncut ends 22, 24 along the reverse bend 44, the contacting device subassembly 46 is formed as a one-piece element without any need for welding together of separate deflector blades. This results in a high-strength contacting device subassembly 46 that can be fabricated more quickly and less expensively than would otherwise be required if the deflector blades 18 and 20 were required to be welded together. Similarly, the contacting device 10 can be quickly assembled from the contacting device subassemblies 46 with a minimum of welding required.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A method of making a contacting device assembly, comprising the steps of:
   cutting and bending a sheet of material to form a plurality of contacting devices, each of the contacting devices comprising:
      a first grid formed of a first set of spaced-apart and parallel-extending deflector blades;
      a second grid formed of a second set of spaced-apart and parallel-extending deflector blades that are interleaved with and cross the first set of deflector blades at a preselected angle, adjacent ones of the interleaved deflector blades in the first and second sets of deflector blades each having opposite ends and side edges, the side edges having portions that join the adjacent ones of the interleaved deflector blades in the first and second sets of deflector blades along a first transverse strip where the first and second sets of deflector blades cross,
      wherein the side edge portions that join the adjacent ones of the interleaved deflector blades of the first and second sets of deflector blades along the first transverse strip where the first and second sets of deflector blades cross are uncut and wherein cut portions extend from the uncut portions to the opposite ends of the first and second sets of deflector blades, each of the deflector blades in the second set of deflector blades having a bent portion that places segments of each of the deflector blades in the second set of deflector blades on opposite sides of the bent portion in offset planes;
      apertures formed in the deflector blades of the first and/or second sets of deflector blades;
      directional tabs associated with the apertures, the directional tabs extending at an angle in the range of 5 to 65 degrees from a plane of the deflector blades in the first and/or second sets of deflector blades;
      a third grid formed of a third set of spaced-apart and parallel-extending deflector blades; and
      a fourth grid formed of a fourth set of spaced apart and parallel-extending deflector blades that are interleaved with and cross the third set of deflector blades at a preselected angle, adjacent ones of the interleaved deflector blades in the third and fourth sets of deflector blades each having opposite ends and side edges, the side edges having uncut portions that join the adjacent ones of the interleaved deflector blades in the third and fourth sets of deflector blades along a second traverse strip where the third and fourth sets of deflector blades cross and cut portions that extend from the uncut portions to the opposite ends of the third and fourth sets of deflector blades, each of the deflector blades in the fourth set of deflector blades having a bent portion that places segments of the deflector blades in the fourth set of deflector blades on opposite sides of the bent portion in offset planes, wherein one of the ends in at least some of the deflector blades in the first set of deflector blades is uncut and is interconnected with an uncut one of the ends of the deflector blades in the third set of deflector blades along a reverse bend that aligns the first and second grids of deflector blades with the third and fourth grids of deflector blades, wherein the offset planes of the segments of the deflector blades in the second set of deflector blades are parallel to each other and the offset planes of the segments of the deflector blades in the fourth set of deflector blades are parallel to each other, wherein one of the ends in each of the deflector blades in the second set of deflector blades is spaced apart from and aligned with one of the ends in each of the deflector blades in the fourth set of deflector blades; and joining adjacent ones of the contacting devices together by joining the uncut ends of the deflector blades in the first and third sets of deflector blades in one of the contacting devices to the spaced apart and aligned ends of the deflector blades in the second and fourth sets of deflector blades in the other one of the contacting devices to form the contacting device assembly.

2. A contacting device assembly comprising at least two contacting devices for the countercurrent contacting of a solid and liquid phase or a liquid and vapor phase, each of said contacting devices comprising:

a first grid formed of a first set of spaced-apart and parallel-extending deflector blades;

a second grid formed of a second set of spaced-apart and parallel-extending deflector blades that are interleaved with and cross the first set of deflector blades at a preselected angle, adjacent ones of the interleaved deflector blades in the first and second sets of deflector blades each having opposite ends and side edges, the side edges having portions that join the adjacent ones of the interleaved deflector blades in the first and second sets of deflector blades along a first transverse strip where the first and second sets of deflector blades cross, wherein the side edge portions that join the adjacent ones of the interleaved deflector blades of the first and second sets of deflector blades along the first transverse strip where the first and second sets of deflector blades cross are uncut and wherein cut portions extend from the uncut portions to the opposite ends of the first and second sets of deflector blades, each of the deflector blades in the second set of deflector blades having a bent portion that places segments of each of the deflector blades in the second set of deflector blades on opposite sides of the bent portion in offset planes;

apertures formed in the deflector blades of the first and/or second sets of deflector blades;

directional tabs associated with the apertures, the directional tabs extending at an angle in the range of 5 to 65 degrees from a plane of the deflector blades in the first and/or second sets of deflector blades;

a third grid formed of a third set of spaced-apart and parallel-extending deflector blades; and a fourth grid formed of a fourth set of spaced apart and parallel-extending deflector blades that are interleaved with and cross the third set of deflector blades at a preselected angle, adjacent ones of the interleaved deflector blades in the third and fourth sets of deflector blades each having opposite ends and side edges, the side edges having uncut portions that join the adjacent ones of the interleaved deflector blades in the third and fourth sets of deflector blades along a second traverse strip where the third and fourth sets of deflector blades cross and cut portions that extend from the uncut portions to the opposite ends of the third and fourth sets of deflector blades, each of the deflector blades in the fourth set of deflector blades having a bent portion that places segments of the deflector blades in the fourth set of deflector blades on opposite sides of the bent portion in offset planes, wherein one of the ends of each of the deflector blades in the first set of deflector blades is uncut and is interconnected with an uncut one of the ends of the deflector blades in the third set of deflector blades along a reverse bend that aligns the first and second grids of deflector blades with the third and fourth grids of deflector blades, wherein the offset planes of the segments of the deflector blades in the second set of deflector blades are parallel to each other and the offset planes of the segments of the deflector blades in the fourth set of deflector blades are parallel to each other, wherein one of the ends in each of the deflector blades in the second set of deflector blades is spaced apart from and aligned with one of the ends in each of the deflector blades in the fourth set of deflector blades, wherein the interconnected uncut ends of the deflector blades in the first and third sets of deflector blades in one of the contacting devices are joined to said spaced apart and aligned ends of the deflector blades in the second and fourth sets of deflector blades in an adjacent one of the contacting devices.

* * * * *